(12) United States Patent
Kwon et al.

(10) Patent No.: US 8,345,621 B2
(45) Date of Patent: Jan. 1, 2013

(54) METHOD AND APPARATUS FOR TRANSMITTING SIGNALS ACCORDING TO THE SEGMENTED ACCESS

(75) Inventors: Yeong-Hyeon Kwon, Anyang-Si (KR); Seung Hee Han, Anyang-Si (KR); Hyun Hwa Park, Anyang-Si (KR); Dong Cheol Kim, Anyang-Si (KR); Hyun Woo Lee, Anyang-Si (KR); Min Seok Noh, Anyang-Si (KR); Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 12/376,747

(22) PCT Filed: Aug. 8, 2007

(86) PCT No.: PCT/KR2007/003803
§ 371 (c)(1),
(2), (4) Date: Jun. 15, 2010

(87) PCT Pub. No.: WO2008/018745
PCT Pub. Date: Feb. 14, 2008

(65) Prior Publication Data
US 2010/0278137 A1   Nov. 4, 2010

Related U.S. Application Data

(60) Provisional application No. 60/822,325, filed on Aug. 14, 2006, provisional application No. 60/823,050, filed on Aug. 21, 2006, provisional application No. 60/863,329, filed on Oct. 27, 2006.

(30) Foreign Application Priority Data

| Aug. 8, 2006 | (KR) | ........................ 10-2006-0074764 |
| Sep. 25, 2006 | (KR) | ........................ 10-2006-0092835 |
| Sep. 25, 2006 | (KR) | ........................ 10-2006-0092836 |
| Feb. 1, 2007 | (KR) | ........................ 10-2007-0010476 |

(51) Int. Cl.
*H04W 4/00* (2009.01)
*H04J 3/00* (2006.01)
*H04J 4/00* (2006.01)
*H04B 7/212* (2006.01)
*H04L 12/40* (2006.01)

(52) U.S. Cl. ........ 370/330; 330/345; 330/347; 330/436; 330/438

(58) Field of Classification Search .......... 370/328–330, 370/343, 345, 347, 436, 442
See application file for complete search history.

(56) References Cited

U.S. PATENT DOCUMENTS 5,319,374 A * 6/1994 Desai et al. .................... 342/387

(Continued)

FOREIGN PATENT DOCUMENTS

KR   10-2001-0082697 A   8/2001

(Continued)

OTHER PUBLICATIONS

RACH Design for Large Cell Deployment, 3GPP TSG WG1 Meeting #46, R1-062307, Tallinn, Estonia, Aug. 28-Sep. 1, 2006.

(Continued)

*Primary Examiner* — Ronald Abelson
(74) *Attorney, Agent, or Firm* — Birch, Stewart, Kolasch & Birch, LLP

(57) ABSTRACT

A method and apparatus of transmitting signals for segmented access in a communication system is disclosed. The method for transmitting signals from a user equipment in a communication system includes the steps of selecting a predetermined channel structure depending on location of the user equipment among available channels defined differently depending on the location of the user equipment within a cell, and transmitting signals using the selected channel structure. Also, a method for transmitting signals using sequences allocated differently depending on location of a user equipment within a cell is disclosed.

18 Claims, 22 Drawing Sheets

U.S. PATENT DOCUMENTS

| | | | |
|---|---|---|---|
| 5,642,355 A * | 6/1997 | Smith | 370/337 |
| 5,914,947 A * | 6/1999 | Saito | 370/337 |
| 7,768,965 B2 | 8/2010 | Kwon et al. | |
| 7,894,396 B2 | 2/2011 | Noh et al. | |
| 2002/0160781 A1 | 10/2002 | Bark et al. | |
| 2004/0157602 A1 | 8/2004 | Khawand | |
| 2004/0162075 A1 * | 8/2004 | Malladi et al. | 455/442 |
| 2004/0214590 A1 | 10/2004 | Al-Housami et al. | |
| 2007/0123257 A1 * | 5/2007 | Noll et al. | 455/436 |
| 2007/0165567 A1 | 7/2007 | Tan et al. | |
| 2008/0101306 A1 | 5/2008 | Bertrand et al. | |
| 2008/0130588 A1 | 6/2008 | Jeong et al. | |
| 2008/0192678 A1 | 8/2008 | Bertrand et al. | |
| 2010/0034155 A1 * | 2/2010 | Noh et al. | 370/329 |

FOREIGN PATENT DOCUMENTS

| | | |
|---|---|---|
| KR | 10-2005-0053714 A | 6/2005 |
| KR | 10-2006-0060487 A | 6/2006 |

OTHER PUBLICATIONS

RACH Sequence Extension Methods for Large Cell Deployment, 3GPP TSG RAN 1 LTE WG1 Meeting #46, R1-062306, Tallinn, Estonia, 7pages, Aug. 28-Sep. 1, 2006.

R1-062275, Comparison of Zadoff-Chu and Zero Correlation Zone Codes for E-UTRA RACH, TSG-RAN WG1 #46, 7 pages, 2006.

R1-062387, RACH in Support of High-Speed UEs, TSG-RAN WG1 Meeting #46, 9 pages, 2006.

* cited by examiner (a)

(b)

(c)

METHOD AND APPARATUS FOR TRANSMITTING SIGNALS ACCORDING TO THE SEGMENTED ACCESS

This application is the National Phase of PCT/KR2007/003803 filed on Aug. 8, 2007, which claims priority under 35 U.S.C. 119(e) to U.S. Provisional Application Nos. 60/822,325 filed on Aug. 14, 2006, 60/823,050 filed on Aug. 21, 2006, and 60/863,329 filed on Oct. 27, 2006 and under 35 U.S.C. 119(a) to patent application Ser. Nos. 10-2006-0074764 filed in Korea on Aug. 8, 2006, 10-2006-0092835 filed on Sep. 25, 2006, 10-2006-0092836 filed on Sep. 25, 2006 and 10-2007-0010476 filed on Feb. 1, 2007, all of which are hereby expressly incorporated by reference into the present application.

TECHNICAL FIELD

The present invention relates to mobile communication technologies, and more particularly, to a method and apparatus for transmitting signals to perform segmented access in a communication system.

BACKGROUND ART

Examples of an uplink channel of a communication system which is currently being discussed include a random access channel (RACH) for random access of a user equipment to a base station, and an uplink common channel (for example, HS-DPCCH) for transmitting channel quality indicator (CQI) and ACK/NACK information. Among them, the RACH is a random access channel which a user equipment performs downlink synchronization with a base station and can identify through base station information. Location, etc. of a corresponding channel can be identified from the base station information, and the RACH is a unique channel to which the user equipment can access in a state that the user equipment is not synchronized with the base station. If the user equipment transmits a signal to a corresponding base station through the RACH, the base station notifies the user equipment of correction information of uplink signal timing and various kinds of information for allowing the user equipment to connect with the base station. After the user equipment is connected with the base station through the RACH, communication can be performed using other unlink channel.

FIG. 1 and FIG. 2 illustrate examples of a procedure of connecting uplink communication between a user equipment and a base station.

The user equipment can acquire uplink and downlink synchronization with the base station and access a corresponding base station by accessing the RACH. Referring to FIG. 1, the user equipment is powered on and first connected with the base station. Referring to FIG. 2, if synchronization is dislocated or an uplink resource is requested (namely, a resource for uplink transmission data is requested) after the user equipment is initially synchronized with the base station, the user equipment accesses the base station.

First of all, in step (1) of FIG. 1 and FIG. 2, the user equipment transmits an access preamble to the base station, and also may transmit a message to the base station if necessary. Then, the base station identifies whether the corresponding user equipment has accessed the RACH for what purpose, and takes a corresponding action. In case of initial access as illustrated in FIG. 1, the base station allocates timing information and uplink data resources to the corresponding user equipment in steps (2) and (3), so that the user equipment can transmit uplink data as illustrated in step (4).

Meanwhile, step (1) of FIG. 2 illustrates an example of the reason why the user equipment accesses RACH is scheduling request (SR). In next step (2), the base station allocates timing information and resources for SR to the user equipment, and performs uplink data resource allocation (step (4)) in response to SR (step (3)) of the user equipment to allow the user equipment to perform uplink data transmission (step (5)).

In accessing the RACH, in case of FIG. 2 not initial access, different signals can be used depending on a signal sent to the RACH is synchronized with the base station.

FIG. 3 illustrates a structure of RACH signal used in a synchronized access and a non-synchronized access.

In case of the synchronized access, after performing synchronization with the base station, the user equipment accesses the RACH in a state that synchronization is maintained between the user equipment and the base station (synchronization is maintained through a downlink signal or control information such as CQ pilot transmitted to an uplink). In this case, the base station can easily identify signals included in the RACH. Since synchronization is maintained between the user equipment and the base station, the user equipment can use a longer sequence or transmit additional data as illustrated in an upper part of FIG. 3. On the other hand, in case of the non-synchronized access, if synchronization is not maintained between the user equipment and the base station for some reason when the user equipment accesses the base station, the user equipment should set a guard time as illustrated in a lower part of FIG. 3 in accessing the RACH. The guard time is set considering maximum round-trip delay of the user equipment which desires to receive a service within the base station.

The length of the RACH should depend on a size of a cell of the base station. Round-trip delay becomes great if the user equipment becomes far away from the base station. This means that the guard time set for the user equipment in the non-synchronized access becomes long. Also, if the size of the cell becomes great, path loss between the user equipment and the base station becomes great, whereby signals are required to be transmitted by spreading. This is illustrated in FIG. 4.

FIG. 4 illustrates the size of the cell and the length of the channel.

As illustrated in FIG. 4, the length of the channel, especially a time axis length of the RACH is set in proportional to the size of the cell in a place where a communication system will be actually installed. FIG. 4 illustrates an example of RACHs defined by three types depending on whether the size of the cell is divided into small size, medium size, or large size. Whether the cell is divided into what ranges may depend on conditions of the corresponding system.

How RACH signal is transmitted for different RACH lengths is divided into two types in the current 3GPP LTE. One type is to increase the length of the RACH signal to be provided in a minimum sized cell by simply repeating the RACH signal when the size of the cell becomes great. The other type is to use different sequences defined for channels of different lengths. If a signal of a minimum sized cell is repeatedly used, it is advantageous that the user equipment becomes simple correspondingly. On one hand, since a short sequence is repeatedly used to use a longer RACH, it is disadvantageous that an available random access sequence becomes short. On the other hand, if long sequences are respectively defined and used, it is advantageous that the base station can use a lager number of random access sequences with better detection performance. In this case, complexity of the user equipment increases.

FIG. 5 respectively illustrates a case where a single sequence is repeated to form a long channel signal and a case where different sequences are defined depending on each length.

Referring to FIG. 5, the case where a single sequence is repeated to form a long channel signal in a large cell is shown in an upper part while the case where different sequences are defined is shown in a lower part.

As described above, as the size of the cell increases, the length of the RACH, i.e., the number of subframes occupied by the RACH in a time region increases. Also, if the distance between the user equipment and the base station increases as the size of the cell increases, it is advantageous to increase a frequency width occupied by the RACH.

FIG. 6 illustrates that a frequency band occupied by the RACH increases depending on the size of the cell.

If the distance between the user equipment and the base station increases as the size of the cell increases, path loss of the RACH signal transmitted from the user equipment and delay spreading increase. Accordingly, if the size of the cell increases, the RACH has a longer time length as illustrated in FIG. 4 and a wider bandwidth to compensate for path loss. FIG. 6 illustrates that a bandwidth occupied by the RACH increases if the cell is divided into a small cell, a medium cell, and a large cell.

When sequences are defined and used as described above, requirements of the sequences are to increase success probability when user equipments (UE) in the boundary of the cell access the base station. However, among user equipments within the large cell, not only user equipments having the same distance from the base station as the size of the cell but also user equipments close to the base station exist. Accordingly, sequences according to requirements of the user equipments located in the boundary of the cell are generated based on these user equipments only in a design method which does not consider that success probability inside the cell is different from success probability in the boundary of the cell. If the generated sequences are used as illustrated in FIG. 4 and FIG. 5, a problem occurs in that the user equipments close to the base station are forced to use sequences of excessive requirements. A concept of "segmented access" in which different requirements are required depending on the location of the user equipments within the large cell is not recognized conventionally.

Meanwhile, how sequences applied to the RACH for data transmission to the base station in the aforementioned synchronized access and non-synchronized access are divided and allocated to the user equipments will be described below.

If the number of a total of sequences to be actually used in the RACH is determined, how to use the sequences in each cell should be determined. In the current 3GPP LTE (hereinafter, LTE) system, $2^{15}=32768$ sequences are required, and a random access selected by one user equipment should indicate 6 bits. Accordingly, 64 sequence groups are set. In this case, 512 random access groups are required. In this way, a total number of available sequences should be allocated to each cell, and a method of reusing the sequences is limited depending on whether a sequence based system is a synchronized network or a non-synchronized network.

In the current LTE system, it is difficult to increase reuse of the RACH by differently allocating the sequences on a time-frequency region. Accordingly, the technology of increasing efficient reuse of the sequence in sequence allocation is required. The present invention intends to suggest a method of solving the aforementioned problem considering the requirements which depend on the distance the user equipment and the base station within the cell like the aforementioned segmented access.

DISCLOSURE OF THE INVENTION

Accordingly, the present invention is directed to a method and apparatus for transmitting signals according to segmented access, which substantially obviates one or more problems due to limitations and disadvantages of the related art.

An object of the present invention is to provide a method and apparatus for performing efficient resource management by determining a length of a channel, which a user equipment uses, based on location information of the user equipment within a cell.

Another object of the present invention is to provide a method and apparatus for increasing detection performance for retransmission by increasing a length of a retransmission channel if there is no response to random access of a user equipment from a base station.

Still another object of the present invention is to perform design of a sequence applied as RACH signal, RACH structure and analysis of RACH to more effectively use RACH if a radius of a cell is large in a channel of a mobile communication system, specifically a random access channel used for uplink synchronization, and to provide a segmented access scheme.

Further still another object of the present invention is to provide a method of increasing a reuse rate of sequences within a cell and a method and apparatus for transmitting signals using the same, in which sequences are differently allocated to each region considering requirements which depend on the distance between a base station and a user equipment within the cell.

Further still another object of the present invention is to provide a method of decreasing a collision probability in RACH, in which the number of available sequences is increased by redefining sequences considering different requirements for each region, and a method of preventing signal detection performance from being deteriorated even though sequences having different lengths are used.

To achieve these objects and other advantages and in accordance with the purpose of the invention, as embodied and broadly described herein, the present invention provides a method for transmitting signals based on a segmented access scheme. Namely, in one aspect of the present invention, a method for transmitting signals from a user equipment in a communication system includes the steps of selecting a predetermined channel configuration depending on location of the user equipment among available channel configurations defined differently depending on the location of the user equipment within a cell, and transmitting signals using the selected channel configuration. In this case, the available channel configurations defined differently are configurations obtained by allocating resources differently depending on the location of the user equipment. The available channels configurations defined differently may be defined to use resources of the channel differently depending on the location of the user equipment. The resources used differently include time resources, frequency resources or time and frequency resources.

Preferably, the available channels configurations defined differently are defined to allocate sequences differently depending on the location of the user equipment. In this case, the step of transmitting the signals includes determining a region to which the user equipment belongs among a plurality of regions divided depending on a distance between the user equipment and a base station, and transmitting the sequences allocated to the determined region by using the selected channel.

Preferably, if the determined region is a region which is adjacent to a boundary of the cell within a predetermined distance among the plurality of regions, the sequences allocated to the determined region are different from those allocated to adjacent cells, and if the determined region is a region which is far away from the boundary of the cell at a predetermined distance or greater among the plurality of regions, the sequences allocated to the determined region are commonly used with the adjacent cells.

Furthermore, the sequences allocated differently are those having different lengths of zero correlation zones (ZCZ).

Furthermore, the communication system increases at least one of time resources of the channel, frequency resources of the channel, and intervals of ZCZs in proportion to a radius of the cell.

Furthermore, the channel may be a random access channel, and location information of the user equipment within the cell may be acquired through signal attenuation of downlink signals or using relative delay time and timestamp information of downlink signals in a multi-cell. The location information of the user equipment within the cell may be acquired by initially accessing the base station using a channel structure defined based on a case where the user equipment within the cell is the farthest away from the base station, and determining the location of the user equipment within the cell through signals received from the base station in response to the initial access. Also, the location information of the user equipment within the cell may be acquired by a method of determining the location by receiving signals broadcasted from the user equipment at a multi-adjacent base station. The step of selecting a channel includes considering at least one of path loss, round-trip delay and a speed of the user equipment.

Meanwhile, in the preferred embodiment of the present invention, if there is no response to signal transmission of the step of transmitting signals from the base station, the method further includes retransmitting the signals using a second channel configuration in which time resources, frequency resources or and time and frequency resources are more increased than the first selected channel structure.

In another aspect of the present invention, a method for transmitting signals from a user equipment in a communication system includes the steps of determining a region where the user equipment is located among regions divided depending on a distance between the user equipment and a base station, selecting resources of a channel for transmitting the signals depending on the determined region, and transmitting the signals using the selected resources.

In this case, the selected resources are increased in a time region, a frequency region, or time and frequency regions as the distance between the base station and the user equipment increases. The step of transmitting signals includes transmitting sequences having lengths increased depending on increase in size of the selected resources.

The sequences having the increased lengths are extended sequences or repeated sequences, the extended sequences being generated to have a size of the resource region of which size is increased, and the repeated sequences being generated by repeating basic sequences.

In still another aspect of the present invention, a method for transmitting signals from a user equipment in a communication system includes the steps of selecting a predetermined sequence depending on location of the user equipment among available sequences allocated depending on the location of the user equipment within the cell, and transmitting the signals using the selected sequence.

In this case, the step of selecting a predetermined sequence includes determining a region to which the user equipment belongs among a plurality of regions divided depending on a distance between the user equipment and a base station, and selecting the predetermined sequence among sequences allocated to the determined region.

Preferably, if the determined region is a first region which is adjacent to a boundary of the cell within a predetermined distance among the plurality of regions, the sequences allocated to the determined region are different from those allocated to adjacent cells, and if the determined region is a second region which is far away from the boundary of the cell at a predetermined distance or greater among the plurality of regions, the sequences allocated to the determined region are commonly used with the adjacent cells.

Furthermore, the sequences allocated to the first region and the sequences allocated to the second region have different zero correlation zones (ZCZ).

In further still another aspect of the present invention, an apparatus of transmitting signals from a user equipment in a communication system includes a channel configuration selection module selecting a channel configuration depending on location of the user equipment among channel configurations defined differently depending on the location of the user equipment within a cell, and a transmission module transmitting the signals using the channel configuration selected by the channel configuration selection module.

In this case, the transmission module includes a sequence selection module selecting sequences depending on the location of the user equipment. Furthermore, the apparatus further includes a location determining module determining location information of the user equipment through signals received from a base station.

ADVANTAGEOUS EFFECT

According to the preferred embodiment of the present invention, since "Nearby UEs" which are close to a base station in a large cell use a part of the entire RACH length, it is possible to increase random access opportunity of each user equipment to the base station. Also, since a random slot which each user equipment can randomly access increases, collision probability in random access of each user equipment can be reduced.

Furthermore, when RACH signal is retransmitted due to failure of random access to the base station, it is possible to increase random access success probability by increasing the length of the sequence to be applied within the RACH length which is allowed.

Moreover, it is possible to more efficiently receive the RACH signal of a plurality of user equipments by efficiently distributing the increased RACH slot to the plurality of user equipments.

Furthermore, according to the embodiment of the present invention, it is possible to efficiently reduce overhead of physical resources by allocating different physical resources depending on location of each user equipment within a cell or defining different resources among the physical resources allocated to the channel, and to provide a random access opportunity to the user equipments.

Furthermore, it is possible to reduce collision probability in the RACH by using a corresponding channel depending on location of each user equipment within the cell among channel structures which are differently defined. If sequences which are differently defined are used depending on the location of each user equipment within the cell, it is possible to reduce collision due to selection of the same sequence.

Furthermore, if sequences used for segmented access according to location of each user equipment within the cell are newly defined, it is possible to increase the number of available sequences of user equipments in the center of the cell.

Furthermore, according to the embodiment of the present invention, it is possible to a reuse rate of sequences within the cell by allocating sequences differently for each region based on a segmented access scheme which considers requirements required differently depending on the distance between the user equipment and the base station within the cell. Specifically, sequences are allocated to a boundary region of the cell by setting a proper reuse factor to divide the boundary region of the cell from an adjacent cell whereas all sequences are allocated to a center region of the cell. In this case, as more sequences are allocated, it is possible to increase the random access opportunity of the user equipment correspondingly. Also, a sequence set divided from that of the adjacent cell is allocated to the boundary region of the cell while common sequences which are common to all cells are allocated to the center region of the cell. In this case, it is possible to simplify hardware such as a correlator for signal detection of the RACH and improve detection performance.

Furthermore, it is possible to increase the number of available sequences by redefining sequences considering requirements required differently for each region, specifically setting a zero correlation zone (ZCZ) having a narrower width than that of the boundary region of the cell in case of sequences allocated to the center region of the cell, thereby reducing collision probability in the RACH.

Moreover, it is possible to prevent signal detection performance of the RACH from being degraded by using sequences in the boundary region of the cell as repeated sequences in the center region of the cell even though sequences having different lengths are used depending on the region within the cell.

BEST MODE FOR CARRYING OUT THE INVENTION

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out. Hereinafter, the detailed description includes detailed matters to provide full understanding of the present invention. However, it will be apparent to those skilled in the art that the present invention can be carried out without the detailed matters. For example, "terminal" will be described as a transmitting subject which transmits uplink signals, and "base station" will be described as a receiving subject which receives uplink signals. However, the present invention is not limited to these terms, and "user equipment (UE)" may be referred to as an uplink transmitting subject and "node B" may be referred to as a receiving subject.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The present invention suggests a method of efficiently using a channel if a radius of a cell is great in a mobile communication system, especially a method of using a channel in RACH used for uplink synchronization. In other words, a resource amount of a channel increases in accordance with a radius of a cell. However, although this is useful for user equipments far away from a base station, it results in that lots of resources are unnecessarily given to user equipments close to the base station. Accordingly, if a radius of a cell is great, a design of a channel structure and a corresponding channel signal is performed based on "segmented access scheme" to more effectively use a channel.

There are provided two issues in using the channel. One issue is to how a signal to be used for the channel is used, and the other issue is to how a structure of a channel is implemented.

Figure 7:
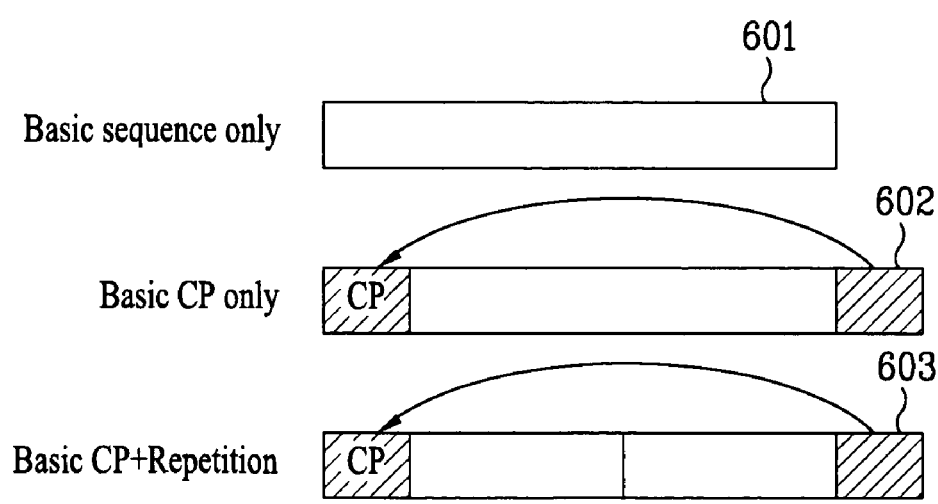
FIG. 7 illustrates a basic structure of forming a channel signal.

FIG. 7 illustrates a basic structure which forms a channel signal.

Like a base sequence structure 601 designated as "Basic sequence only" on an upper part of FIG. 7, a signal generated from a sequence (for example, CAZAC such as GCL CAZAC and Zadoff-Chu CAZAC, which is mainly used in 3GPP, and gold code mainly used in WCDMA) may directly be inserted to the channel to perform communication. Particularly, the CAZAC sequence, which is advantageous for power boosting due to a certain size and is also advantageous for synchronization acquisition due to excellent correlation characteristic, will be described below.

Two types of CAZAC sequences, i.e., GCL CAZAC sequence and Zadoff-Chu CAZAC sequence as described above, are used as the CAZAC sequences. The two types of CAZAC sequences are associated with each other by a conjugate complex relation. Accordingly, the Zadoff-Chu CAZAC sequence is obtained by conjugate complex calculation for the GCL CAZAC sequence. The Zadoff-Chu CAZAC sequence is given as follows.

$$c(K; N, M) = \exp\left(\frac{j\pi Mk(k+1)}{N}\right) \quad \text{[Equation 1]}$$
(for odd $N$)

$$c(K; N, M) = \exp\left(\frac{j\pi Mk^2}{N}\right) \quad \text{[Equation 2]}$$
(for even $N$)

where k represents a sequence index, N represents a length of CAZAC sequence to be generated, and M represents sequence ID.

When the Zadoff-Chu CAZAC sequence given by the Equations 1 and 2 and the GCL CAZAC sequence which is a conjugate complex relation with the Zadoff-Chu CAZAC sequence is represented by c(k; N,M), three features are obtained as follows.

$$|C(k; N, M)| = 1 \quad \text{[Equation 3]}$$
(for all $k, N, M$)

$$R_{M;N}(d) = \begin{cases} 1, & (for\, d = 0) \\ 0, & (for\, d \neq 0) \end{cases} \quad \text{[Equation 4]}$$

$$R_{M1,M2;N}(d) = p \text{ (for all } M_1, M_2 \text{ and } N) \quad \text{[Equation 5]}$$

The Equation 3 means that the CAZAC sequence always has a size of 1, and the Equation 4 shows that an auto-correlation function of the CAZAC sequence is expressed by a delta function. In this case, the auto-correlation is based on circular correlation. Also, the Equation 5 shows that a cross-correlation is always a constant.

The feature illustrated in the Equation 3 provides an advantage of a transmitter capable of sufficiently boosting a time region signal as described above as a signal transmitted to a channel has a constant size. The Equation 4 suggests a basis capable of finding exact time synchronization when the user equipment detects a sequence from a channel. The Equation 5 can efficiently identify each base station when channels of several base stations are transmitted together.

The structure 601 illustrated on the upper part of FIG. 7 illustrates a basic sequence structure in which various sequences including the CAZAC sequence are simply inserted to a channel without cyclic prefix (CP) or repetition structure. In this case, comparing to the 'CP insertion structure 602' designated as "Basic CP only,", and 'CP insertion and repetition structure 603' designated as "Basic CP+Repetition,", because CP is not used, a transmission signal can be sent with the longest length. Accordingly, if 'basic sequence structure 601' is used for RACH, the most information can be sent. However, since there is no repetition structure such as 'CP insertion and repetition structure 603,' a problem occurs in that it is necessary to check whether there is a signal for every time delay, to detect a signal. This can cause much load to the base station. Also, although dependent upon signal length, if a cyclic prefix such as 'CP insertion structure 602' and 'CP insertion and repetition structure 603' is not used, it is not allowed that an error is generated when the base station (receiver) detects the RACH signal. The 'basic sequence structure 601' which does not include cyclic prefix causes a timing error when the base station (receiver) detects the RACH signal if channel distortion such as multi-path is generated. If the signal is carried in OFDM subcarrier, orthogonality of OFDM signal may be damaged, whereby a problem occurs when the receiver detects a signal.

Figure 6:
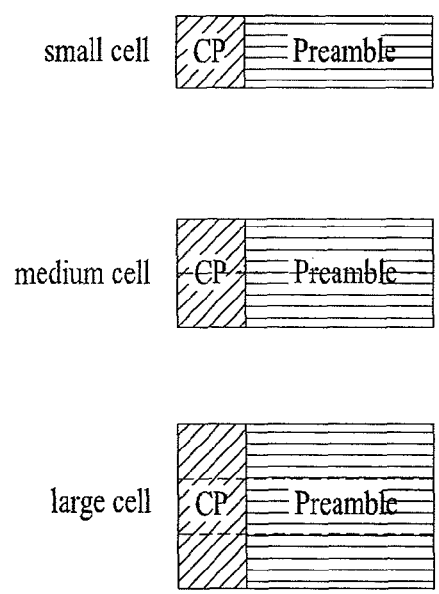
FIG. 6 illustrates that a frequency band occupied by RACH increases depending on a size of a cell.

To allow cyclic prefix (CP) to be used under a multi-path environment, CP such as 'CP insertion structure 602' designated as "Basic CP only" is located at the front of the signal at the medium of FIG. 6 so that the receiver is robust to timing error due to multi-path. In this case, although the receiver may disregard the timing error due to multi-path, a problem occurs in that signal detection is required for every delay time location.

If signal detection in every location is absurd or impossible, the structure such as 'CP insertion and repetition structure 603' designated as "Basic CP+Repetition" at the lower part of FIG. 7 may be used so that the channel signal has a repetition structure. In this case, the receiver which has received RACH signal can detect timing for a receiving signal based on auto-correlation. This allows the receiver to easily detect timing because it is not necessary to identify what signal is as requested in timing detection based on auto-correlation illustrated in the Equation 5, and another processing in addition to auto-correlation is not needed. However, a problem occurs in that an information amount that can be sent is reduced as a signal length becomes short due to the repetition structure.

FIG. 7 illustrates a channel signal structure used to access a basic unit channel supported by a system. If a length of a channel should be extended, it can be extended by various methods as follows.

Figure 8:
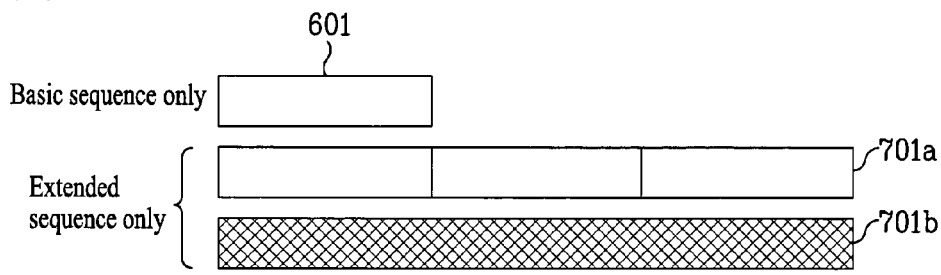
FIG. 8 illustrates a method of forming a channel structure in a large cell through the basic structure shown in FIG. 7.
Figure 8:
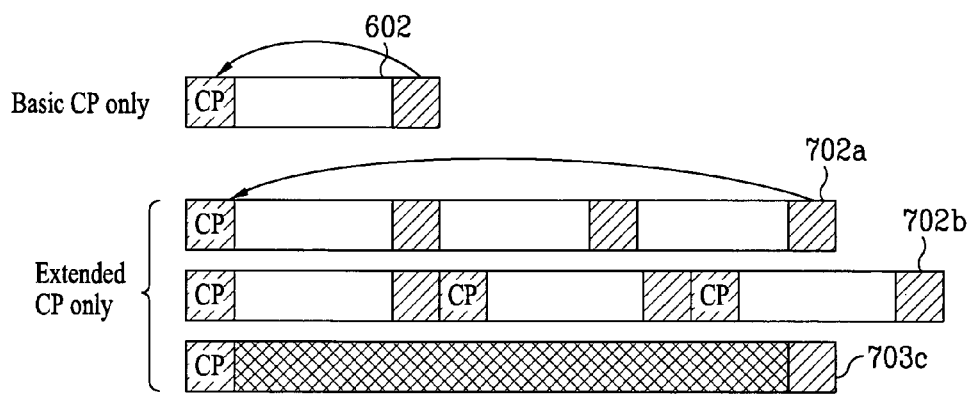
Figure 8:
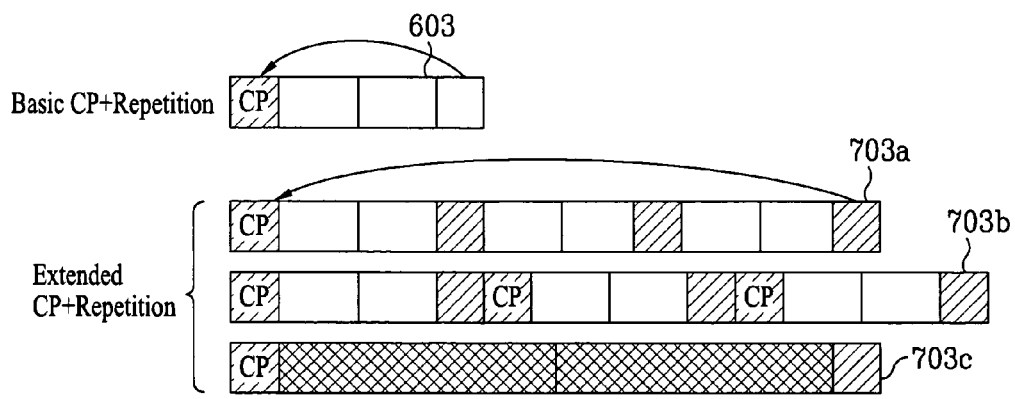

FIG. 8 illustrates a method of forming a channel structure in a large cell through the basic structure illustrated in FIG. 7.

Hereinafter, an example of RACH will be described. The basic structure of the RACH is extended from each structure of FIG. 7. The method of forming the channel structure is divided into a method of repeating a basic sequence and a method of generating a sequence for a new length without repetition. In other words, one method is to transmit a sequence to RACH through a structure 701a among structures designated as "extended sequence only" by simply repeating the sequence three times if "Basic sequence only 601" in which a signal such as CAZAC sequence exists is simply extended to apply to RACH having a length of three times without cyclic prefix and repetition structure. The other method is to generate a long sequence by defining a sequence of a length available in a place where a basic sequence is not repeated but extended as illustrated in a structure 701b. This is shown in (a) of FIG. 8.

Similarly, "Basic CP only 602" can be extended. The other parts excluding the CP at the front are repeated as illustrated in a structure 702a, parts including the CP are simply repeated as illustrated in a structure 702b to form a signal, or a long sequence is newly generated to apply CP to the front as illustrated in a structure 702c. This structure is illustrated in (b) of FIG. 8.

Similarly, the "Basic CP+Repetition 603" can be applied. In this case, a sequence having a repetition structure is repeated excluding CP as illustrated in a structure 703a to generate a long sequence or a sequence including CP is repeated to generate a long sequence as illustrated in a structure 703b. Also, a method of generating a long sequence having a repetition structure and transmitting the sequence with CP as illustrated in a structure 703c may be considered. If the RACH signal is extended as illustrated in (c) of FIG. 8 by the above methods, the user equipment accesses the extended RACH using an extended sequence so that user equipments far away from the base station performs communication with the base station in spite of path loss and round-trip delay, thereby performing uplink synchronization.

Figure 9:
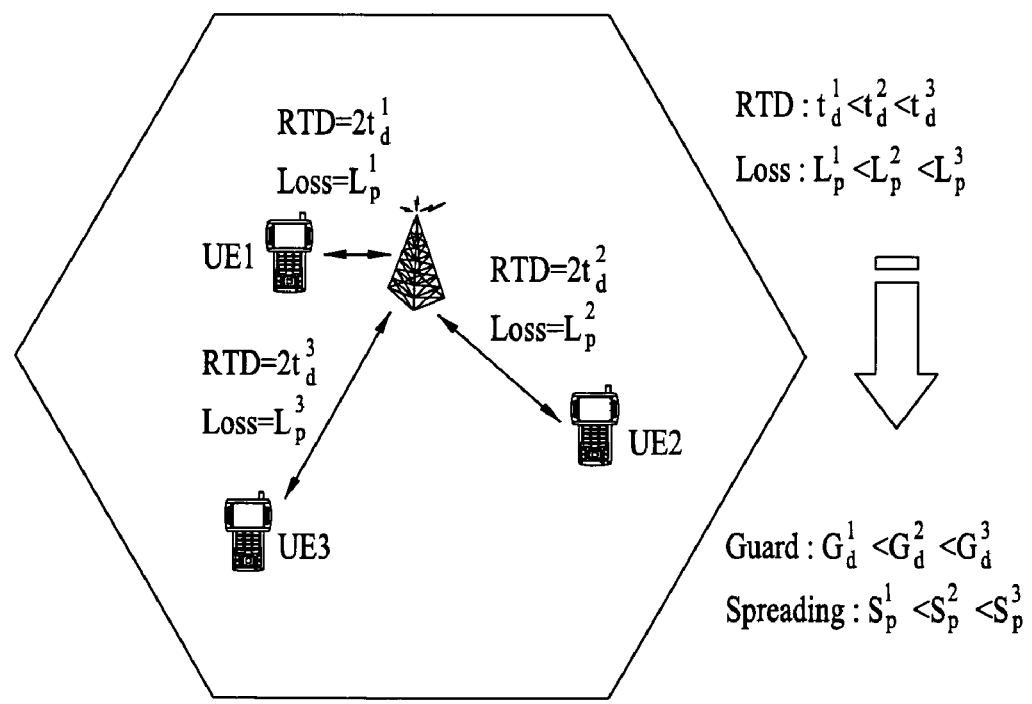
FIG. 9 illustrates a phenomenon occurring depending on a distance between each user equipment and a base station in a large cell.

FIG. 9 illustrates a phenomenon occurring depending on the distance between each user equipment and the base station in a large cell.

Referring to FIG. 9, a user equipment UE3 which exists in the edge of a cell supported by the base station, a user equipment UE2 which exists in the middle of a cell, and a user equipment UE1 which exists closest to the base station are exemplarily shown. Also, referring to FIG. 9, path losses of these user equipments UE1, UE2 and UE3 are represented by $L_p^1$, $L_p^2$ and $L_p^3$, respectively, and their round-trip delays are represented by $2t_d^1$, $2t_d^2$ and $2t_d^3$, respectively. In this case, each of $2t_d^1$, $2t_d^2$ and $2t_d^3$ represents twice of each of $t_d^1$, $t_d^2$ and $t_d^3$, which are required time delay for unidirectional transmission. Generally, the amount of path loss increased according to the distance between each user equipment and the base station. Namely, path loss occurs in the order of $L_p^1 < L_p^2 < L_p^3$. Likewise, round-trip delay occurs in the order of $2t_d^1 < 2t_d^2 < 2t_d^3$. Accordingly, respective guard durations required depending on location of the user equipments UE1, UE2 and UE3 within the cell have lengths $G_d^1$, $G_d^2$ and $G_d^3$, wherein the lengths have a relation of $G_d^1 < G_d^2 < G_d^3$. Likewise, spreading coefficients $S_p^1$, $S_p^2$, and $S_p^3$ of sequences to be applied to a channel have a relation of $S_p^1 < S_p^2 < S_p^3$.

In other words, when the user equipment UE3 accesses RACH with a long RACH and a high spreading coefficient, the user equipment UE3 can obtain performance equivalent to performance obtained when the user equipment UE1 accesses RACH with a shorter RACH and a low spreading coefficient. However, although the user equipment UE1 can use short length RACH and so on, the size of the RACH is designed to adapt to requirements for supporting the edge user equipment (for example, UE3) of the cell if the cell has a large radius. Accordingly, the user equipment which is close to the base station, such as UE1, should use a long RACH, which waist the RACH resource.

Figure 10:
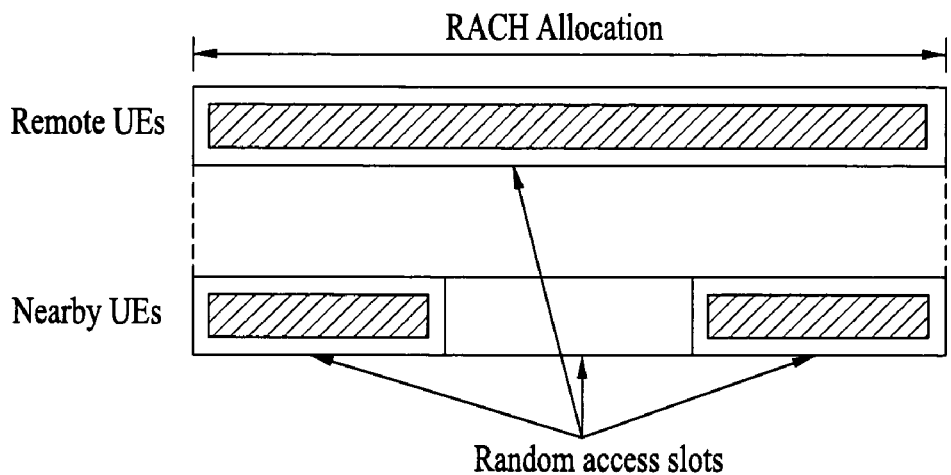
FIG. 10 illustrates a method of newly defining RACH signal depending on location of user equipments within a cell in accordance with the preferred embodiment of the present invention.

FIG. 10 illustrates a method of newly defining RACH signal depending on location of each user equipment within a cell in accordance with the preferred embodiment of the present invention.

As described above, to efficiently perform random access in a communication system which increases a length of the RACH allowed in proportion to the radius of the cell, each user equipment selects a proper length among the entire length of the RACH allowed within the cell based on location information within its cell, applies a sequence having appropriate length to the RACH, and transmits the sequence. This is more efficient than communication performed by all user equipments within the cell using the RACH having a length to support a user equipment which is located at the boundary of the cell. In more detail, "Nearby UEs" which are close to the base station in a large cell use a part of the entire RACH length which is allowed, as illustrated in FIG. 10, to increase a random access opportunity of each user equipment to the base station. Also, by this approach, since a random slot which each user equipment can randomly access increases, collision probability in random access of each user equipment can be reduced. Furthermore, as described later in more detail, when the RACH signal is retransmitted due to failure of random access to the base station, it is possible to increase random access success probability by increasing the length of the sequence to be applied for the nearby UE within the entire RACH length which is allowed. Here, there may be a case that each user equipment is hard to identify it's own location information. So, each user equipment can use the amount of path loss of the downlink signal as a location information. Meanwhile, those skilled in the art can identify that, as illustrated in FIG. 10, use of a specific part of the entire channel length based on the location of the user equipment within the cell can be applied to another uplink channel in addition to the RACH. Moreover, RACH may be affected by the frequency offset. That is, the frequency offset may limit the available number of zero correlation zone (ZCZ; which is the zone where circular shift applied to the sequence can be distinguished) sequences, so may reduce the sequence reuse factor. In this case, repeated sequence structure can be more effective for the high frequency offset environment. So differently defined RACH structure or requirement for each user may further consider the speed of each user equipment.

Hereinafter, an example of a case where the user equipments UE1, UE2 and UE3 illustrated in FIG. 9 use RACH will be described in detail.

According to the embodiment of the present invention as aforementioned, user equipments UE1, UE2 and UE3 shown in FIG. 9 access different RACHs depending on circumstances to which each user equipment belongs. First of all, since all user equipments cannot initially identify their location and distance from the base station and path loss, they access the base station by using the entire length commonly allocated to all user equipments within the cell depending on the size of the cell in case of initial access. Then, the base station forwards synchronization information of an uplink to each user equipment, and the user equipment can identify its location within the cell using synchronization difference between a downlink signal and an uplink signal.

Each of user equipments UE1, UE2 and UE3 which have identified their location can construe RACH differently as illustrated in FIG. 10 based on location information within its cell during random access for access to RACH after initial access. In other words, if the user equipment is far away from the base station, the user equipment repeats a minimum unit sequence using the entire RACH which is allocated as one unit or selects and uses a sequence having a corresponding length (in case of UE3). If a long RACH is not needed as the user equipment is close to the base station, a minimum unit sequence is applied to one of RACHs which are divided into parts of a minimum unit. FIG. 10 illustrates "Nearby UEs" corresponding to UE1 and "Remote UEs" corresponding to UE3. And FIG. 10 illustrates the Nearby UEs use a basic length RACH and the Remote UEs use an extended RACH which is three times of RACH of a basic length. In this case, the location of the used part of the entire RACH, to which the sequence having the selected length is inserted, may generally be selected by the user equipment UE1 randomly in view of characteristics of RACH. Otherwise, the location to which the sequence will be applied may be controlled depending on a predetermined method in view of efficient management of a resource. The user equipment UE2 which is in the middle distance can transmit RACH signal having the selected length, for example, a sequence corresponding to ⅔ of the entire RACH length, based on location information within its cell. And as stated above, RACH requirements for each user equipment may be differentiated according to the speed of the user equipment. For example, the user equipment UE 1 may use ⅔ length of the entire RACH length for using the repeated sequence, instead of ⅓ length, when the speed of the user equipment UE 1 is very high, which means the user equipment UE 1 have a high frequency offset environment.

As described above, the RACH structure used in accordance with the embodiment of the present invention in a communication system which increases the length of the RACH allowed in proportion to the radius of the cell has a structure in which RACH signal having the selected length is inserted to a predetermined location of the entire RACH based on location information within the cell of the user equipment.

It is general that whether each user equipment selects a length to be applied for the sequence among the entire RACH length or whether each user equipment inserts the sequence having the length selected for each user equipment to which part of the entire RACH which is allowed is randomly selected for each user equipment in view of characteristics of RACH as described above. However, after acquiring location information of the user equipment within the cell by means of initial access through the RACH as described above, the base station may select a channel length to be used by the user equipment from the entire length of another uplink channel (for example, uplink common channel which transmits control information such as CQI, ACK/NACK, etc.) excluding the RACH and determine location of the length inserted to the entire channel in view of efficient management of resources.

Accordingly, another embodiment of the present invention suggests a method of allocating uplink resources of each user equipment, i.e., resources to be used for random access of each user equipment after initial access using the RACH to allow the base station to more efficiently manage the resources if a part of the entire channel allocated to all user equipments within the cell is used based on location information within the cell and a slot to be used for the channel increases.

Figure 11:
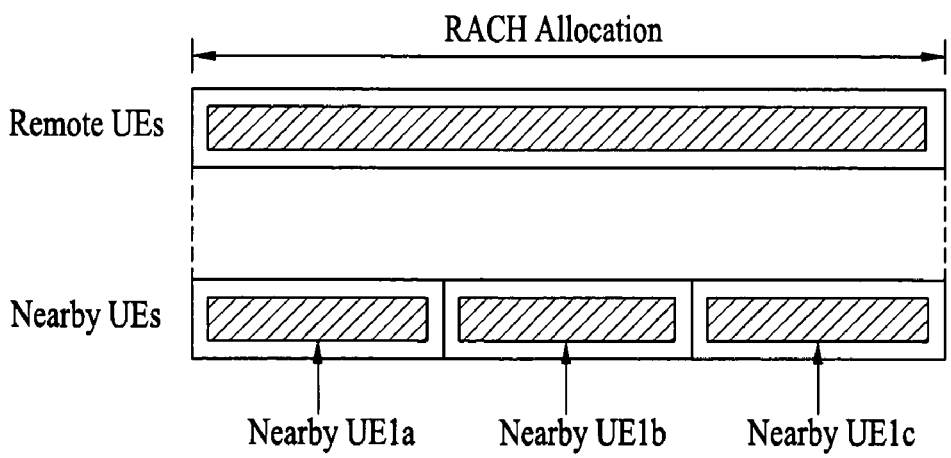
FIG. 11 illustrates a method of allocating a communication resource to a plurality of user equipments using RACH signal newly defined depending on location of user equipments within a cell in accordance with the preferred embodiment of the present invention.

FIG. 11 illustrates a method of allocating a communication resource to a plurality of user equipments using RACH signal newly defined depending on the location of the user equipment within the cell in accordance with the preferred embodiment of the present invention.

Figure 1:
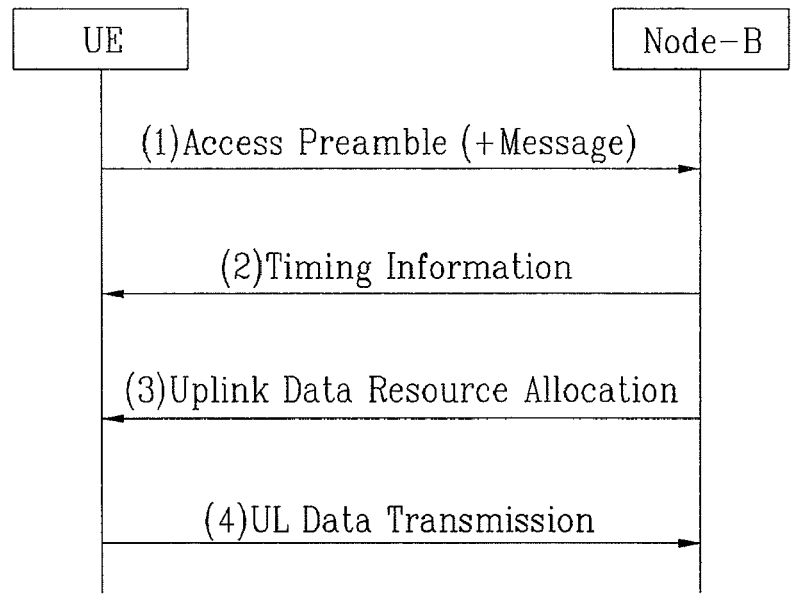
FIG. 1 and FIG. 2 illustrate examples of a procedure of connecting uplink communication between a user equipment and a base station.
Figure 2:
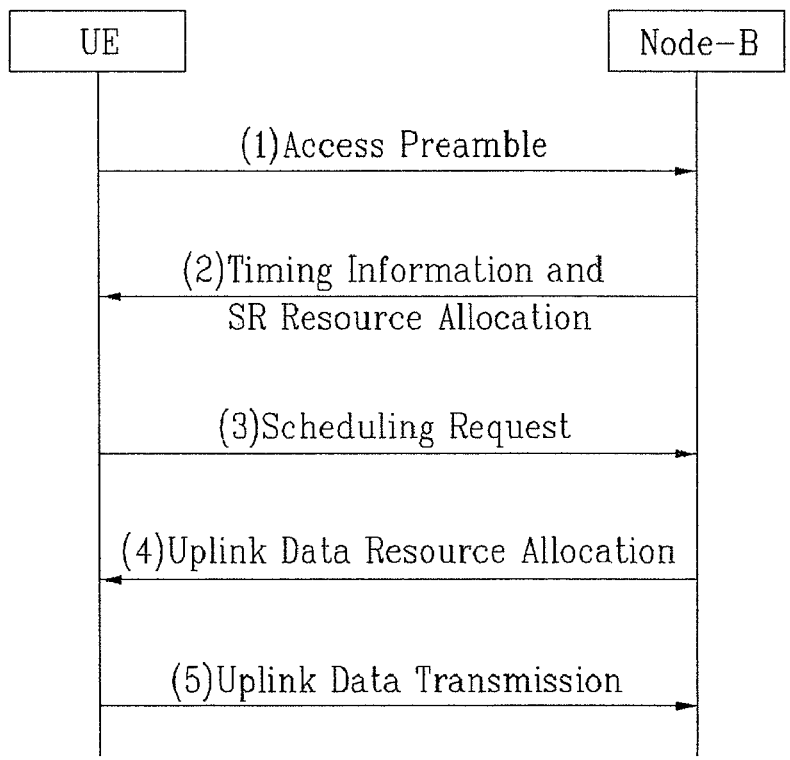
Figure 3:
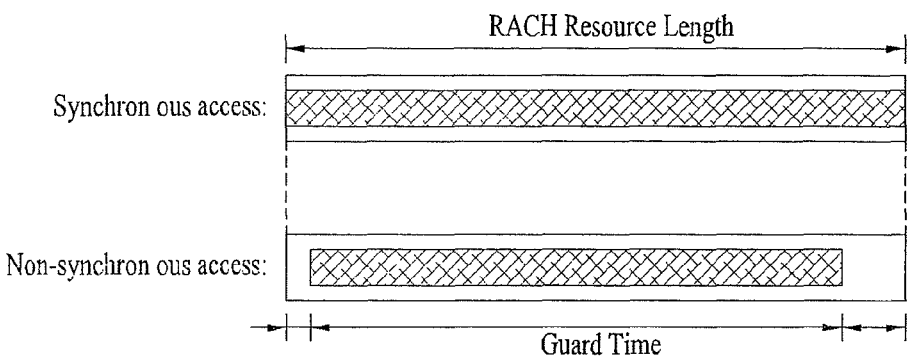
FIG. 3 illustrates a structure of RACH signal used in a synchronized access and a non-synchronized access.
Figure 4:
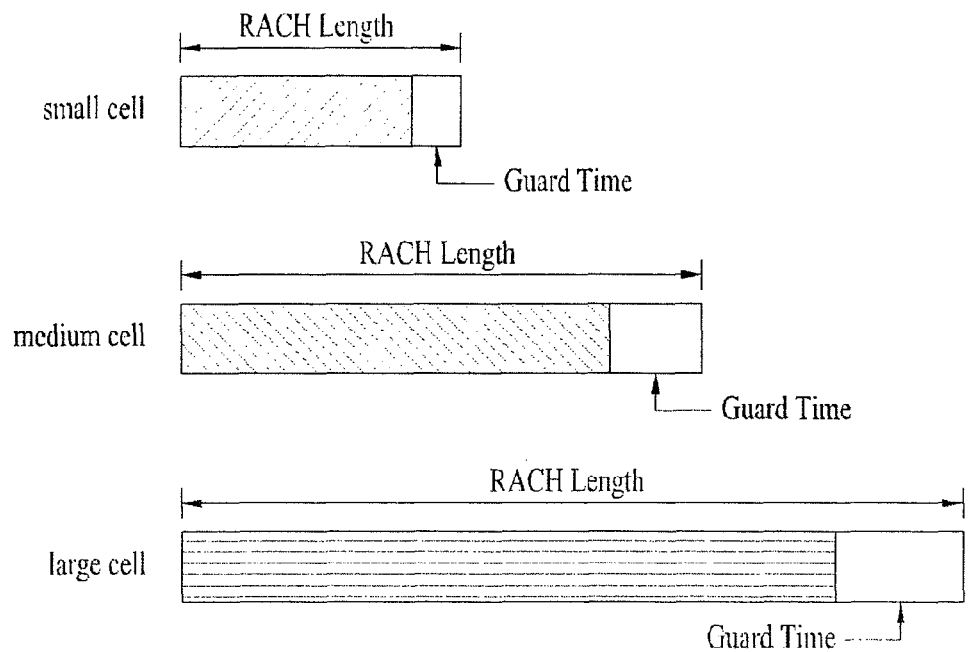
FIG. 4 illustrates a size of a cell and a length of a channel.
Figure 5:
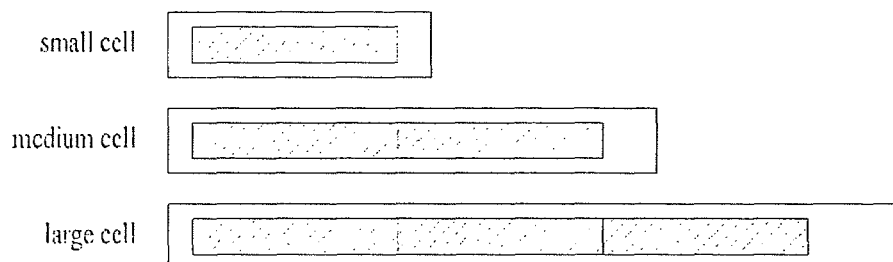
FIG. 5 respectively illustrates a case where a single sequence is repeated to form a long channel signal and a case where different sequences are defined depending on each length.
Figure 5:
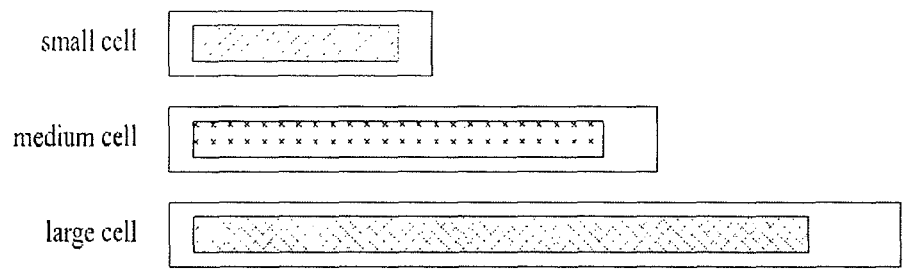

In the communication which increases the length of the random access channel allowed in proportion to the radius of the cell, the base station according to the embodiment of the present invention receives initial access signals of user equipments to acquire location information of each user equipment within the cell. In this case, the base station can acquire location information of each user equipment by comparing synchronization information acquired through the initial access signals transmitted from the user equipments with synchronization information of signals transmitted in response to the initial access signals. The base station can allocate uplink resources of the user equipments based on the acquired location information of each user equipment within the cell. Specifically, as illustrated in FIG. 11, user equipments UE1a, UE1b and UE1c which are close to the base station within the same cell can maintain performance equivalent to that obtained when remote user equipments use the entire RACH even though a part of the entire RACH, for example ⅓ of the entire RACH in case of FIG. 11, is used. Accordingly, the resource can be allocated so that each of these three user equipments can perform random access through one of the entire RACH length divided into three parts. This resource allocation of the base station may be performed for the RACH signal used in the random access step illustrated in FIG. 2 after identifying the location information through initial access illustrated in FIG. 1. Alternatively, the resource allocation of the base station may be performed in the step of separate allocation. In other words, the method of allocating resources according to the embodiment of the present invention is to allow the base station to determine the length to be actually applied by each user equipment to the sequence among the entire RACH and the location for the sequence based on the location information of each user equipment within the cell. Through such resource allocation, the base station can efficiently receive the random access signals from a plurality of users without collision.

Figure 12:
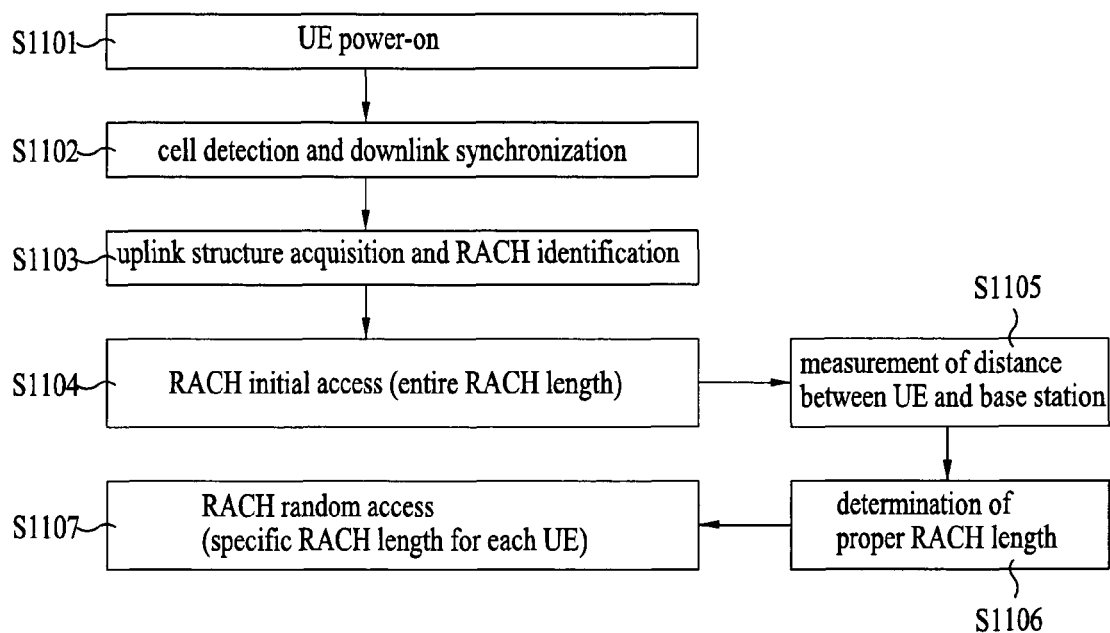
FIG. 12 is a flow chart illustrating a method of forming RACH signal based on location of user equipments within a cell in accordance with the preferred embodiment of the present invention.

FIG. 12 is a flow chart illustrating a method of forming the RACH signal based on the location of each user equipment within the cell in accordance with the preferred embodiment of the present invention.

In step S1101, if full synchronization between the user equipment and the base station is lost as the power of the user equipment is turned on, the user equipment performs cell detection and downlink synchronization through steps S1102 and S1103. Afterwards, the user equipment acquires a structure of an uplink and identifies RACH according to the structure. Then, in step S1104, the user equipment performs initial access by using the entire RACH length allocated within its cell. If a response signal is received from the base station through the initial access, the user equipment compares uplink synchronization information with downlink synchronization information from the received signal, and measures the distance with the base station in step S1105. Afterwards, in step S1106, the user equipment selects the length for the sequence among the entire RACH length based on the location information acquired in step S1105. In other words, the user equipment divides the RACH into parts determined to be sufficient for a service, and selects one of the divided parts. If the user equipment is far away from the base station, the user equipment determines that the entire RACH length is to be used. If the user equipment is close to the base station, the user equipment determines that a part of the entire RACH length is to be used. As stated above, the location can be measured by measuring the amount of path loss of the downlink signal, but any other means than using the path loss of the downlink signal can be used. Also, in the preferred embodiment of this invention, there may be a step (not shown in the FIG. 12) for considering the speed of the user equipment to determine appropriate length of the RACH to be used. Referring back to the FIG. 12, the user equipment performs random access through the RACH length specified for each user equipment in step S1107 in accordance with the determined length information. Considering this status, the base station should use a signal detection algorithm in the RACH.

A channel former for performing the method according to the aforementioned embodiments of the present invention and a configuration of the base station will now be described.

Figure 13:
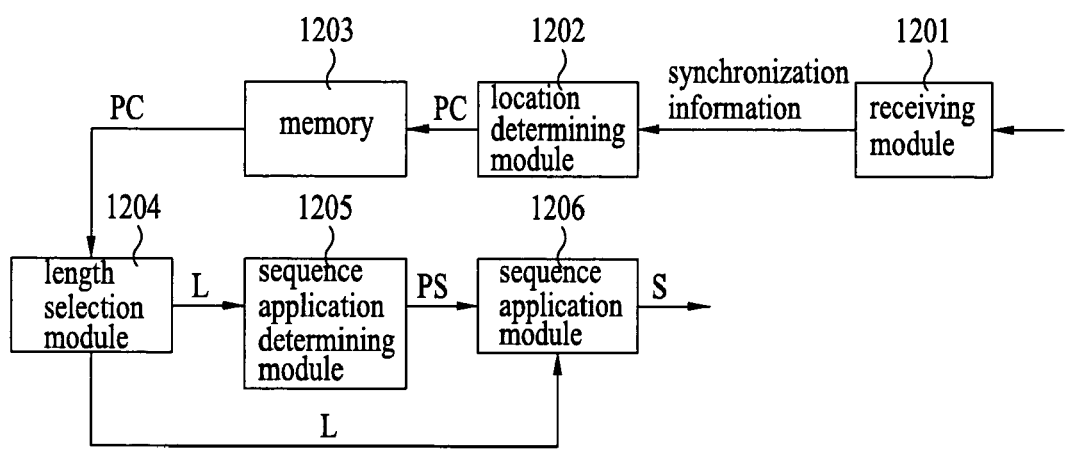
FIG. 13 is a block diagram illustrating a user equipment which forms RACH signal based on location of user equipments within a cell and a channel former included in the user equipment in accordance with the preferred embodiment of the present invention.

FIG. 13 is a block diagram illustrating a user equipment which forms RACH signal based on the location of the user equipment within the cell and a channel former included in the user equipment in accordance with the preferred embodiment of the present invention.

In the communication which increases the length of the random access channel, which is allowed in proportion to the radius of the cell, the channel former of the user equipment according to the embodiment of the present invention includes a length selection module 1204 and a sequence application location determining module 1205. The length selection module 1204 for selecting the length to be actually used from the RACH length selects the length to be used for random access to the base station among the RACH length allowed based on the location information of the user equipment within the cell, i.e., the distance between the base station and the corresponding user equipment. In this case, the user equipment which is close to the base station may not need to use the entire of the allocated RACH considering the boundary of the large cell, and selects a sufficient length for a service among the entire length. Specifically, the length selection module 1204 can select the length considering path loss and round-trip delay based on the distance between the user equipment and the base station.

The location information (PC) of the user equipment within the cell, which is used when the length selection module 1204 selects the length to be used, may previously be stored in a memory 1203. If there is no information of synchronization between the user equipment and the base station like the case where the power of the user equipment is newly turned on, the length selection module 1204 may use the acquired location information within the cell by performing initial access using the entire of the allocation RACH length. To this end, the user equipment according to the embodiment of the present invention may include a receiving module 1201 for receiving a signal responding to initial access from the base station, a location determining module 1202 determining location of the user equipment within the cell by using synchronization information acquired from the receiving module 1201, and a memory 1203 storing information (PC) determined by the location determining module 1202.

As described above, the length information L selected by the length selection module 1204 is input to the sequence application location determining module 1205 and a sequence application module 1206. The sequence application location determining module 1205 determines whether the sequence having the length is inserted to which part of the entire RACH. It is general that such determination of the sequence application location determining module 1205 is randomly performed by the user equipment. However, the determination of the sequence application determining module 1205 may be performed under the control of the base station. Afterwards, the sequence application module to which the determined sequence application location information (PS) and the sequence application length information (L) are input forms a channel signal (S) by applying the sequence having the length L to the location of the information PS in the allocated RACH.

Figure 14:
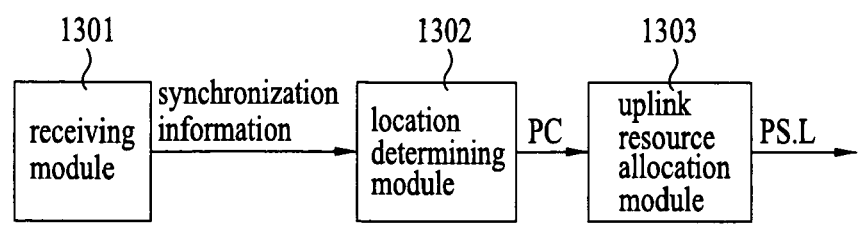
FIG. 14 is a block diagram illustrating a characterized configuration of a base station for receiving RACH signal from a user equipment based on location of a user equipment within a cell and allocating a resource in accordance with the preferred embodiment of the present invention.

FIG. 14 is a block diagram illustrating a characterized configuration of the base station for receiving the RACH signal from the user equipment based on the location of the user equipment within the cell and allocating resources in accordance with the preferred embodiment of the present invention.

In a communication system which increases the RACH length allowed in proportion to the radius of the cell, the base station includes a location determining module 1302 determining the location of each user equipment within the cell and a resource allocation module 1303 allocating uplink resources based on the location information. Specifically, the allocation determining module 1302 determines location information of the distance between each user equipment and the base station on synchronization information received from initial access signals which a receiving module 1301 has received from a random user equipment, and forwards the determined location information to the uplink resource allocation module 1303. Afterwards, the uplink resource allocation module 1303 performs uplink resource allocation of the user equipment based on the location information acquired by the location determining module 1302. In this case, through allocation of the uplink resource allocation module 1303 to each user equipment, it is possible to identify whether RACH length to be used by applying the sequence and the sequence having the length will be transmitted through which part of the RACH.

Meanwhile, the method for transmitting signals according to another embodiment of the present invention relates to a method of increasing a transmission success rate by performing retransmission if there is no response to random access through RACH from the base station.

Hereinafter, the method for transmitting signals according to another embodiment of the present invention will be described in detail.

Figure 15:
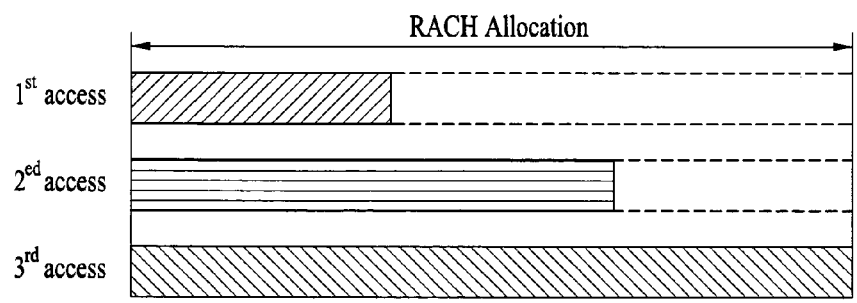
FIG. 15 illustrates a method of forming RACH signal when RACH signal is retransmitted as there is no response to random access of a user equipment from a base station in accordance with the preferred embodiment of the present invention.

FIG. 15 illustrates a method of forming RACH signal when RACH signal is retransmitted as there is no response to random access of the user equipment from the base station in accordance with the preferred embodiment of the present invention.

When a user equipment accesses RACH by the segmented access, if the base station does not recognize signals, a method of increasing the transmission power may be considered. In addition, a method of controlling the length of additional RACH may be considered. In other words, if the power and the length used for initial transmission are P1 and L1, respectively, the power to be used for second transmission is P2(P1≦P2) and the RACH length is L2(L1≦L2). In this way, the power and the length of the RACH signal, which are used per transmission timing point, are controlled to increase the right receiving probability of the base station during retransmission. Also, since the OFDM system does not have a great effect according to increase of the transmission power, it may perform retransmission only by increasing the RACH length with maintaining the transmission power. Moreover, if the length of the sequence transmitted per transmission timing point increases as illustrated in FIG. 15, retransmission may be performed with increasing the length of the sequence on a time axis in a time-frequency region of the OFDM system. At the same time or separately, retransmission may be performed with increasing the length of the sequence on a frequency axis. Thus, diversity can be improved in the time and/or frequency region.

Referring to FIG. 15, the user equipment divides RACH into three slots, wherein ⅓ of the corresponding slot is used in case of the first access of FIG. 15, ⅔ of the corresponding slot is used in case of the second access, and the entire of the corresponding slot is used in case of the third access. In other words, a part of the allocated RACH is filled with signals to perform transmission, and signals of different lengths are transmitted per retransmission. At this time, types of signals to be used can be extended in a type illustrated in FIG. 8.

The aforementioned retransmission method according to the preferred embodiment of the present invention will be described in detail.

Figure 16:
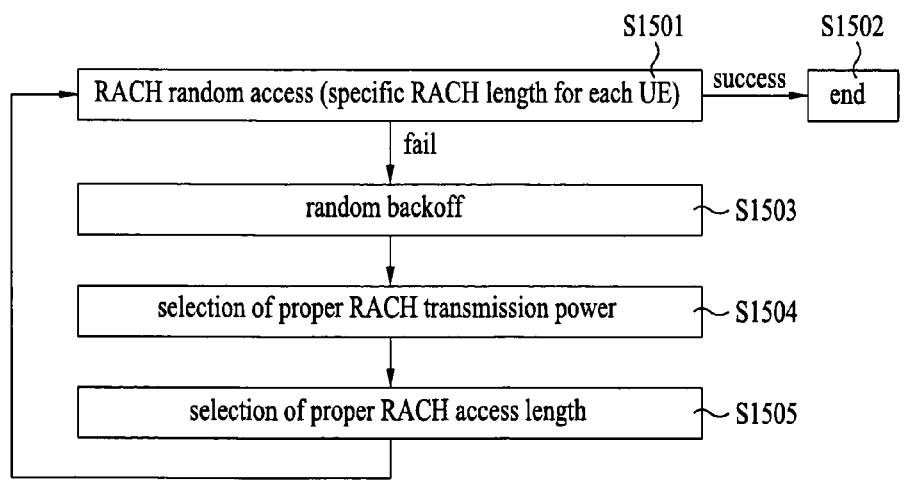
FIG. 16 is a flow chart illustrating a method of forming RACH signal when RACH signal is retransmitted as there is no response to random access of a user equipment from a base station in accordance with the preferred embodiment of the present invention.

FIG. 16 is a flow chart illustrating a method of forming RACH signal when RACH signal is retransmitted as there is no response to random access of the user equipment from the base station in accordance with the preferred embodiment of the present invention.

In step S1501, a random user equipment performs random access to the base station. In this case, the entire length of the RACH allocated to all user equipments within the cell is not used as the length of the sequence used for the RACH by the user equipment. RACH signal having a specific length for each user equipment is used for access, wherein the specific length for each user equipment is selected depending on whether each user equipment is located in what distance from the base station. If a response to such random access from the base station is received, the corresponding user equipment proceeds to step S1502 to achieve its intention through the RACH.

On the other hand, if there is no response to random access of step S1501 from the base station, the user equipment proceeds to step S1503 to perform back-off equivalent to a random length. Afterwards, in step S1504, the user equipment increases the transmission power as compared with that of the RACH signal which is previously transmitted. Also, the user equipment selects a proper access length of the RACH through step S1505. Although the example of the case where both the transmission power and the length of the sequence increase through step S1504 and step S505 has been described with reference to FIG. 15, only the length of the RACH signal used for transmission may be increased. Afterwards, the user equipment returns to step S1501 to perform random access, and may repeat the aforementioned steps.

In the aforementioned embodiments of the present invention, the method of performing RACH access using different lengths in the time region depending on the location of the user equipment within the cell and the method for transmitting RACH signal by increasing the length of the signal if RACH signal is retransmitted as there is no response from the base station have been described.

Hereinafter, a method of performing different resource allocations for RACH depending on the location of the user equipment within the cell (for example, a method of allocating resources at different frequency region lengths as well as different time region lengths), a method of allocating same RACH resources and logically dividing them depending on the location of the user equipment within the cell, and a method of using different sequences depending on the location of the user equipment within the cell will be described.

The reason why the user equipment transmits signals through RACH is to synchronize uplink signals with the corresponding base station and obtain a desired service. To achieve these objects, all user equipments should have a certain success probability within a region defined by one cell regardless of the location of the user equipments. This requirement allows the RACH to occupy the entire system in a small range because the required RACH resources changed little if the size of the cell is small. But if the size of the cell becomes bigger, the required RACH resources become bigger. For example, in the 3GPP LTE system, if one subframe is used as RACH, the system uses overhead of ¹⁄₂₀ as RACH. However, if five subframes should be used as the size of the cell increases, their overhead increases five times, and in this case, greatly affects performance of the entire system.

Although a method of changing a period of the RACH to reduce overhead in a large cell may be used, problems occur in that access latency becomes long when the user equipment accesses the RACH and collision probability in same RACH slots increases. To reduce such RACH overhead, different RACH requirements are needed depending on the location of the user equipment. The RACH having a short length and a narrow bandwidth is sufficiently used if the distance between the base station and the user equipment is short. Since the RACH length is short, the sequence to be transmitted from the user equipment does not need a long sequence. Also, if the user equipment is located near the base station, it is less affected by delay spreading than the user equipment which is located far away from the base station. Accordingly, detection can easily be performed even though an interval of a zero-correlation zone (ZCZ) duration in the sequence applied to the RACH is narrow. As a result, it is preferable to identify the location of the user equipment to select RACH and a sequence which are suitable for the location of the user equipment, rather than define one RACH to allow all user equipments to use the defined RACH.

To this end, how the structure of the RACH is changed depending on the size of the cell will be described.

According to the embodiment of the present invention, as described above, there are provided two examples of sequences used for extended RACH which is extended depending on increase of the size of the cell. The examples of the sequences will now be described in detail.

Of the methods of generating a sequence used for RACH which is extended depending on increase of the size of the cell, the first method is to increase the length of the sequence to adapt to the length of the extended RACH (hereinafter, the sequence used for the extended RACH will be referred to as "extended sequence" or "long sequence"). In this case, available mother sequences increase as the length of the sequence increases. Also, the number of zero-correlation zone (ZCZ) sequences, which are used to maintain orthogonality with the mother sequences by applying circular shift to the mother sequences, increases.

Particularly, since loss load due to path loss increases in accordance with increase of the length of the RACH, the length of the RACH increases exponentially not linearly. For this reason, the size of the cell increases, and the length of the RACH increases rapidly. Accordingly, if the extended sequence is used, it is advantageous in that ZCZ sequence of much more code types can be generated. However, in this case, problems occur in that a transmitting side should generate all kinds of sequences and requirements of hardware such as a correlator become complicated.

Unlike the first method, the second method is to obtain a long sequence by repeating a basic sequence (sequence used for the second method will be referred to as "repeated sequence" or "repetition sequence"). According to this second method, a reference sequence which will be used in a small cell is generated, and if requirements of RACH signal are not satisfied as the size of the cell increases, the length of the RACH increases and the sequence is simply repeated to satisfy the requirements of the RACH signal. In this case, it is advantageous in that the transmitting side or the receiving side can generate a long preamble without additional hardware complexity. However, problems occur in that the number of ZCZ sequences cannot be increased as the size of the cell increases and the number of available mother sequences is smaller than the long RACH channel.

Figure 17:
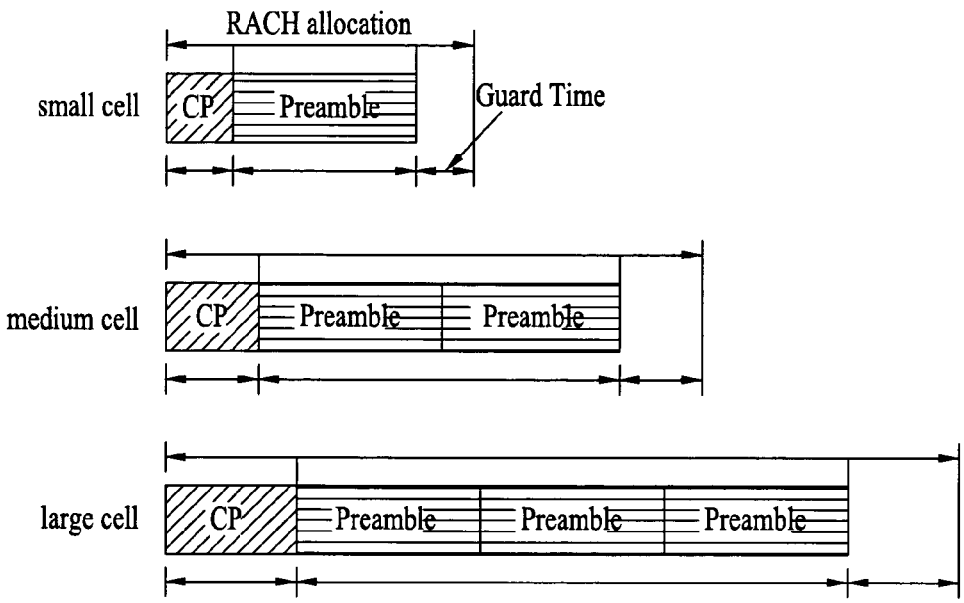
FIG. 17 and FIG. 18 illustrate a structure of a repeated sequence extended by a repetition scheme as a size of a cell increases in case of no repetition structure in a basic sequence and in case of a repetition structure in a basic sequence in accordance with the preferred embodiment of the present invention.
Figure 18:
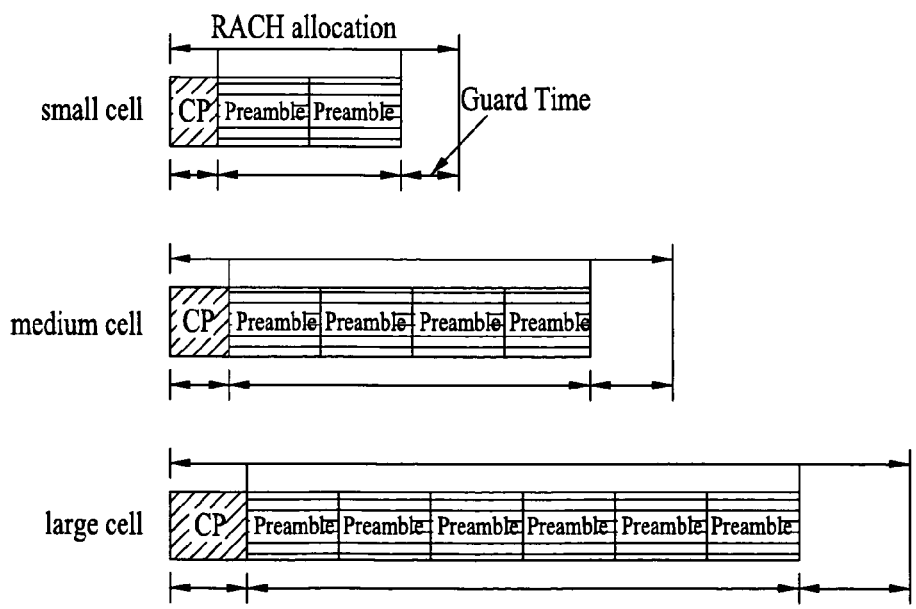

FIG. 17 and FIG. 18 illustrate a structure of the repeated sequence extended by a repetition scheme as the size of the cell increases in case of no repetition structure in a basic sequence and in case of a repetition structure in a basic sequence in accordance with the preferred embodiment of the present invention.

Referring to FIG. 17 and FIG. 18, the sequence is repeated as the RACH becomes long in accordance with increase of the size of the cell in the order of small cell, medium cell and large cell, and CP and the length of a protective duration become long. Referring to FIG. 17, there is no repetition pattern in a basic sequence (for example, sequence inserted to one OFDM symbol duration in the OFDM system). Although a maximum number of sequences can be obtained by the repeated sequence if the length of the RACH increases, since detection cannot be performed by auto-correlation when a random access signal is received, a problem occurs in that the sequence should be detected through full search. On the other hand, referring to FIG. 18, since there is a repetition pattern in the basic sequence, the receiving side can easily detect the sequence through auto-correlation. When there is a repetition pattern in the basic sequence as illustrated in FIG. 18, the number of available sequences is smaller than that of the other case where there is no repetition pattern in the basic sequence.

Figure 19:
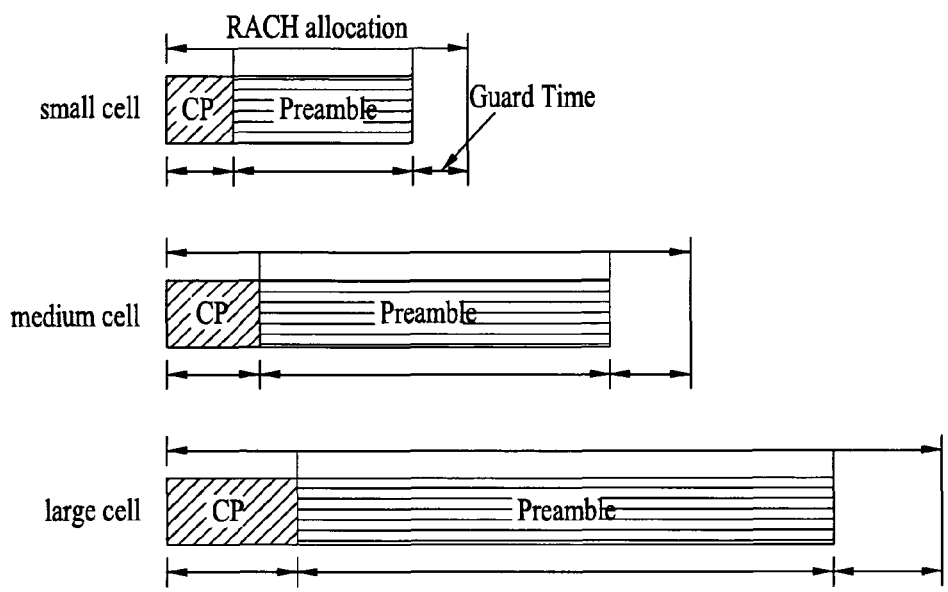
FIG. 19 and FIG. 20 illustrate a structure of extension sequences extended by an extension scheme as a size of a cell increases in case of no repetition structure in a basic sequence and in case of a repetition structure in a basic sequence in accordance with the preferred embodiment of the present invention.
Figure 20:
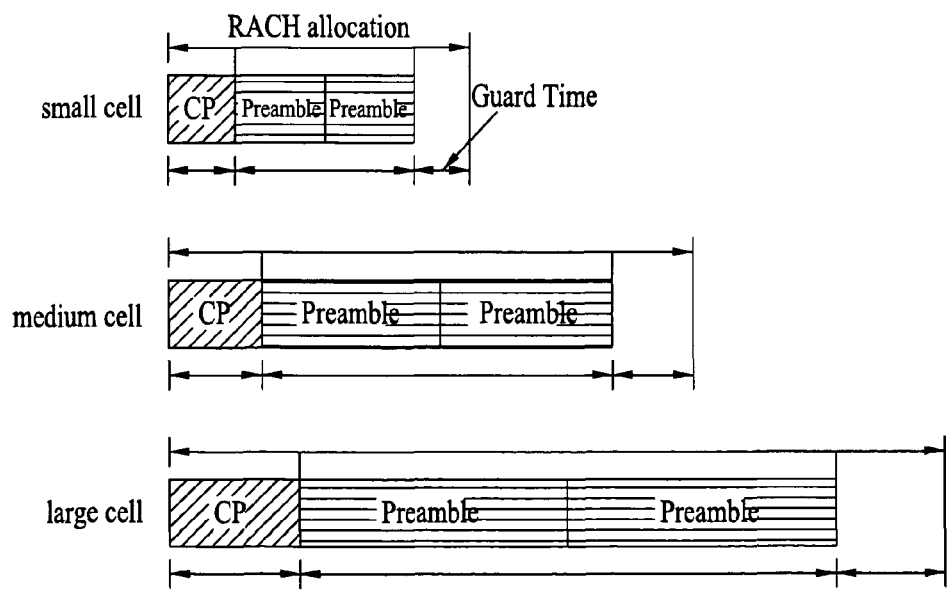

FIG. 19 and FIG. 20 illustrate a structure of extended sequences extended by an extension scheme as the size of the cell increases in case of no repetition structure in the basic sequence and in case of a repetition structure in the basic sequence in accordance with the preferred embodiment of the present invention.

Since the extended sequences are generated depending on the RACH length, a different number of sequences exist depending on the RACH length. Referring to FIG. 19, there is no repetition pattern in the basic sequence to maximize the number of sequences. Referring to FIG. 20, a repetition pattern is inserted to the basic sequence to allow the receiving side to facilitate search. In FIG. 20, a problem occurs in that the number of sequences is reduced and the problem of search complexity in FIG. 17 still exists.

As described above with reference to FIG. 17 to FIG. 20, the structure of the RACH can properly be changed depending on the size of the cell under a corresponding communication environment. FIG. 17 to FIG. 20 relate to the problem of the structure of the RACH according to increase of the size of the cell. As described later, more efficient random access can be provided considering requirements of the RACH, which are required depending on the location of the user equipment within the cell.

Figure 21:
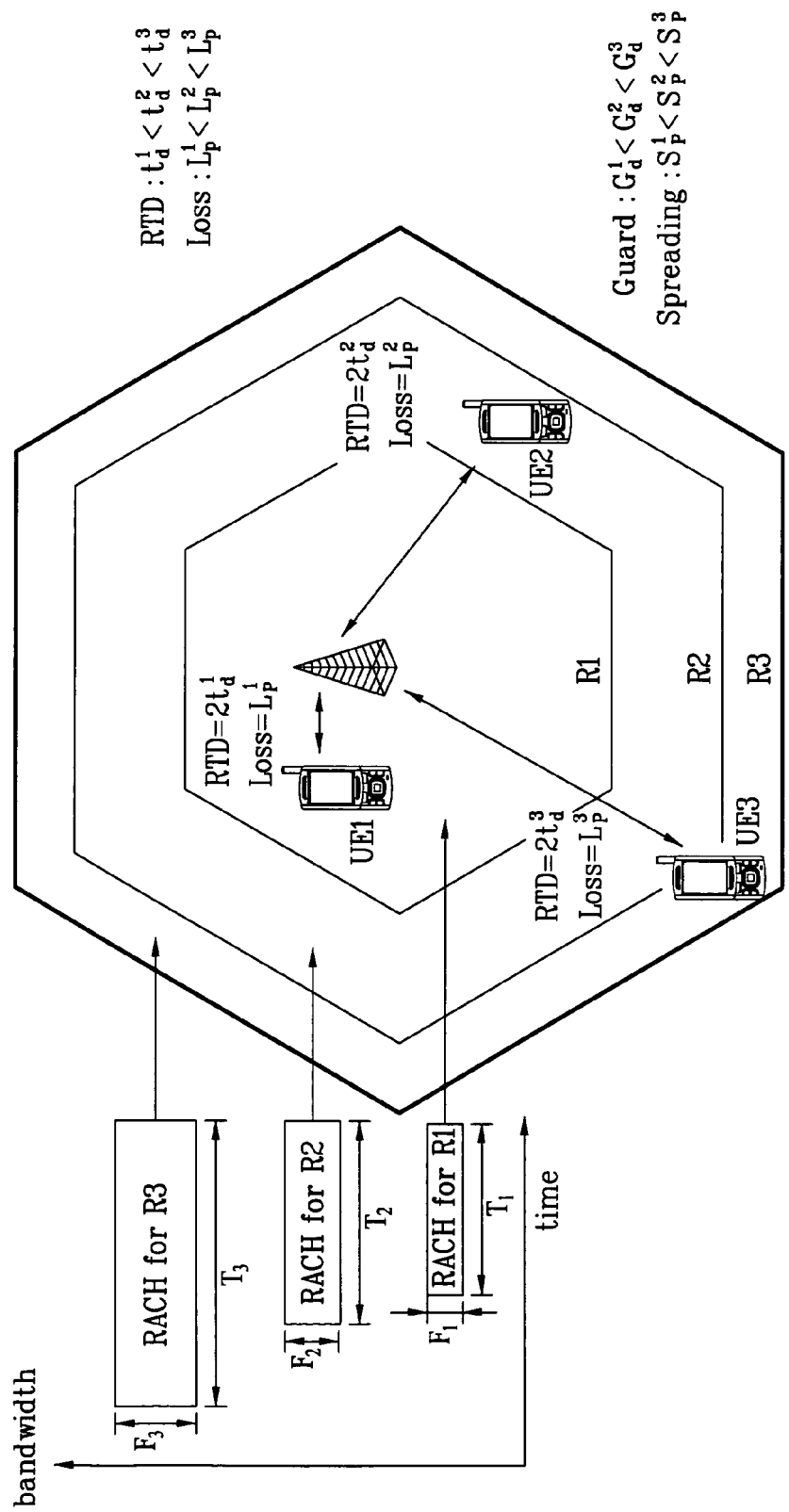
FIG. 21 illustrates a phenomenon occurring depending on distance between a user equipment and a base station in a large cell and resultant requirements of RACH.

FIG. 21 illustrates a phenomenon occurring depending on the distance between each user equipment and the base station in a large cell and resultant requirements of the RACH.

Referring to FIG. 21, as described with reference to FIG. 9, an edge region of a cell which is supported by the base station is represented by R3, a user equipment in the region R3 is represented by UE3, a region existing in the middle of the cell is represented by R2, a user equipment in the region R2 is represented by UE2, a region close to the base station is represented by R1, and a user equipment in the region R1 is represented by UE1. In FIG. 21 like FIG. 9, path losses of these user equipments UE1, UE2 and UE3 are represented by $L_p^1$, $L_p^2$ and $L_p^3$, respectively, and their round-trip delays (RTDs) are represented by $2t_d^1$, $2t_d^2$ and $2t_d^3$, respectively. In this case, like FIG. 9, path loss occurs in the order of $L_p^1 < L_p^2 < L_p^3$, and round-trip delay occurs in the order of $2t_d^1 < 2t_d^2 < 2t_d^3$. Also, lengths $G_d^1$, $G_d^2$ and $G_d^3$ of guard durations have a relation of $G_d^1 < G_d^2 < G_d^3$, and spreading coefficients $S_p^1$, $S_p^2$, and $S_p^3$ of sequences to be applied to a channel have a relation of $S_p^1 < S_p^2 < S_p^3$.

In other words, when the user equipment UE3 accesses RACH with a long RACH and a high spreading coefficient based on a time axis, the user equipment UE3 can obtain performance equivalent to performance obtained when the user equipment UE1 accesses RACH with a shorter RACH and a low spreading coefficient. However, although the user equipment UE1 uses RACH allocated from the base station, the length of the RACH is designed to adapt to requirements for supporting the edge user equipment (for example, UE3) of the cell if the cell has a large radius. Accordingly, the user equipment which is close to the base station, such as UE1, may not need a long RACH.

Furthermore, on a frequency axis, the user equipment UE3 which is located in the region R3 uses RACH which occupies a larger bandwidth to compensate for the largest path loss whereas the user equipment UE1 which is located in the region R1 does not need such a larger bandwidth, and can access the RACH through RACH which occupies a narrow bandwidth as illustrated in FIG. 21, at a success probability equivalent to that of UE1.

Accordingly, in the present invention, all user equipments UEs do not access the RACH at the same condition in a large cell but use the RACH based on the location of the user equipment within the cell. Specifically, supposing that a time length and a frequency length of the RACH which the user equipment UE1 uses are represented by $T_1$ and $F_1$, respectively, a time length and a frequency length of the RACH which the user equipment UE2 uses are represented by $T_2$ and $F_2$, respectively, and a time length and a frequency length of the RACH which the user equipment UE3 uses are represented by $T_3$ and $F_3$, respectively, FIG. 21 illustrates that $T_1 < T_2 < T_3$ and $F_1 < F_2 < F_3$ are satisfied.

Hereinafter, three methods according to the embodiment of the present invention, which include a physical structure of the RACH, a method of using the physical structure of the RACH, and a method of generating a sequence to efficiently use resources in the RACH, will be described based on the aforementioned examples. Meanwhile, it is assumed that all user equipments UEs know path loss and round-trip delay according to the distance between the base station and each user equipment in a certain range. However, each user equipment may undergo a separate step to acquire path loss and round-trip delay through a signal received from the base station, and this will be described later.

Figure 22:
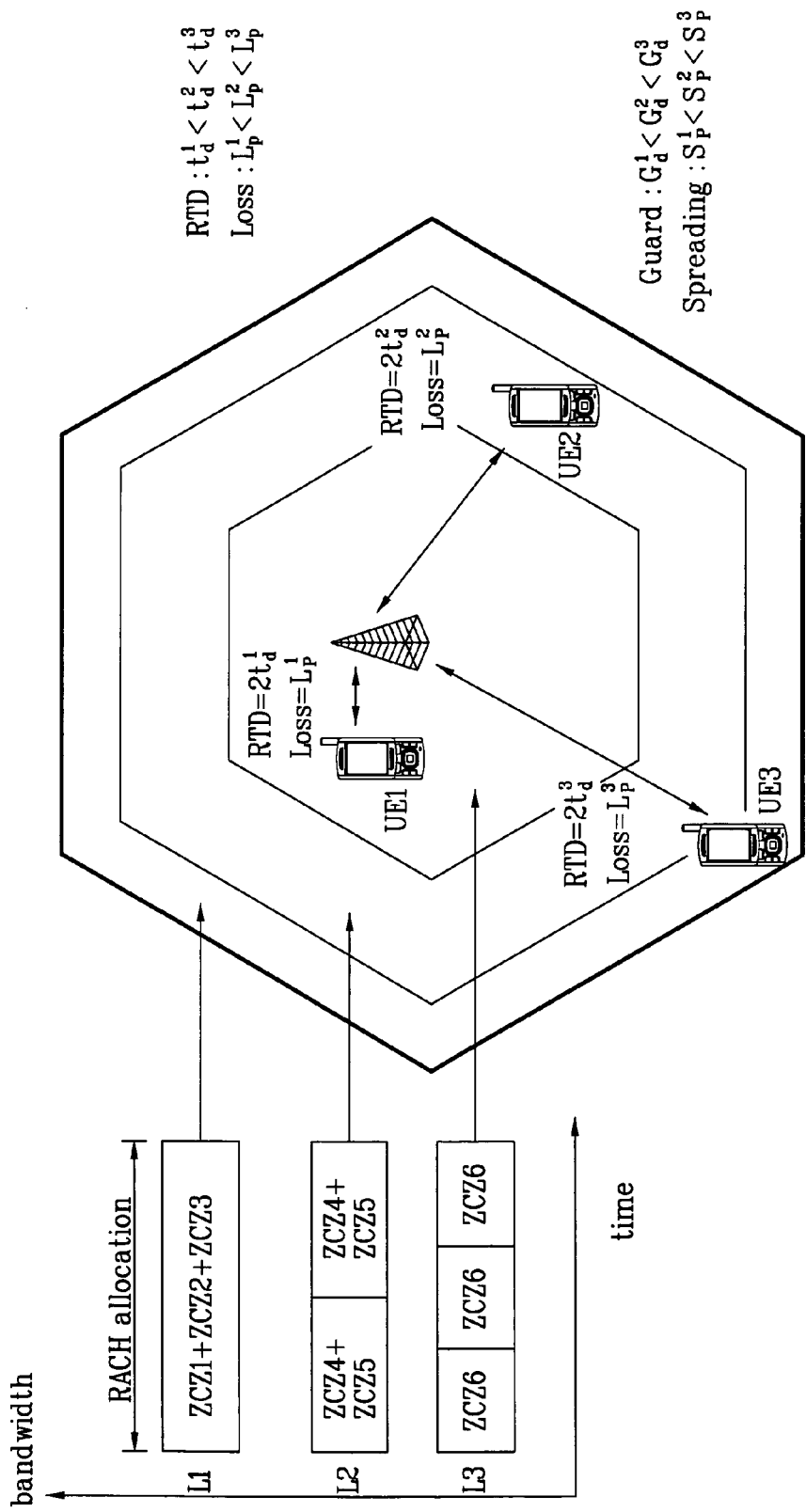
FIG. 22 illustrates a case where a time or frequency region slot and sequence definition are variable in each region within a cell.

FIG. 22 illustrates a case where a time or frequency region slot and sequence definition are variable in each region within the cell.

If the cell is divided into several regions as illustrated in FIG. 22, the user equipments satisfy the requirements of the RACH in a location to which they belong in the cell divided into several regions. Referring to FIG. 22, as described with reference to FIG. 9 and FIG. 21, one cell is divided into three regions R1, R2 and R3 depending on the distance from the base station, and the RACH is defined that the user equipments existing in each region can access the RACH at different methods to represent the RACH as L1, L2 and L3.

The RACH represented as L1, L2 and L3 can physically define several slots which can satisfy random access requirements of the user equipment in the time or frequency region. In FIG. 22, the structure of the RACH represented as L1, L2 and L3 is defined to have different lengths in the time region. In other words, L1 shows that the entire allocation region of the RACH is defined as one channel whereas L2 shows that the entire allocation region of the RACH is defined as two channels and L3 shows that the entire allocation region of the RACH is defined as three channels.

Furthermore, the preferred embodiment of the present invention suggests that available sequences in the region to which the user equipment belongs are defined differently as illustrated in FIG. 22. In case of the sequence applied to the RACH (L1) having a long length, since the time region of the RACH is not divided unlike the other region, the sequence is long, whereby the RACH (L1) includes a large number of zero correlation zones (ZCZs) more than the RACH (L2) and the RACH (L3). Thus, FIG. 9 illustrates that the RACH (L1), the RACH (L2) and the RACH (L3) include three ZCZs, two ZCZs, and one ZCZ, respectively. In this case, ZCZs mean that, if different ZCZ sequences are generated by circular shift applied to the mother sequence, the receiving side distinguishes the zones from one another.

As described above, the number of ZCZs included in the sequence and the length or width of ZCZ applied to the corresponding sequence can be defined differently depending on whether the user equipment is located in what region within the cell. The length of the ZCZ in CAZAC sequence used depending on the location within the cell will be described later with reference to FIG. 28.

In short, when one cell is divided into several regions, each region can have three types of the degree of freedom as follows in use of the RACH:

1) segmented random access slot in a time region; 2) narrow band RACH in a frequency region; and 3) region division based on different sequences.

Figure 23:
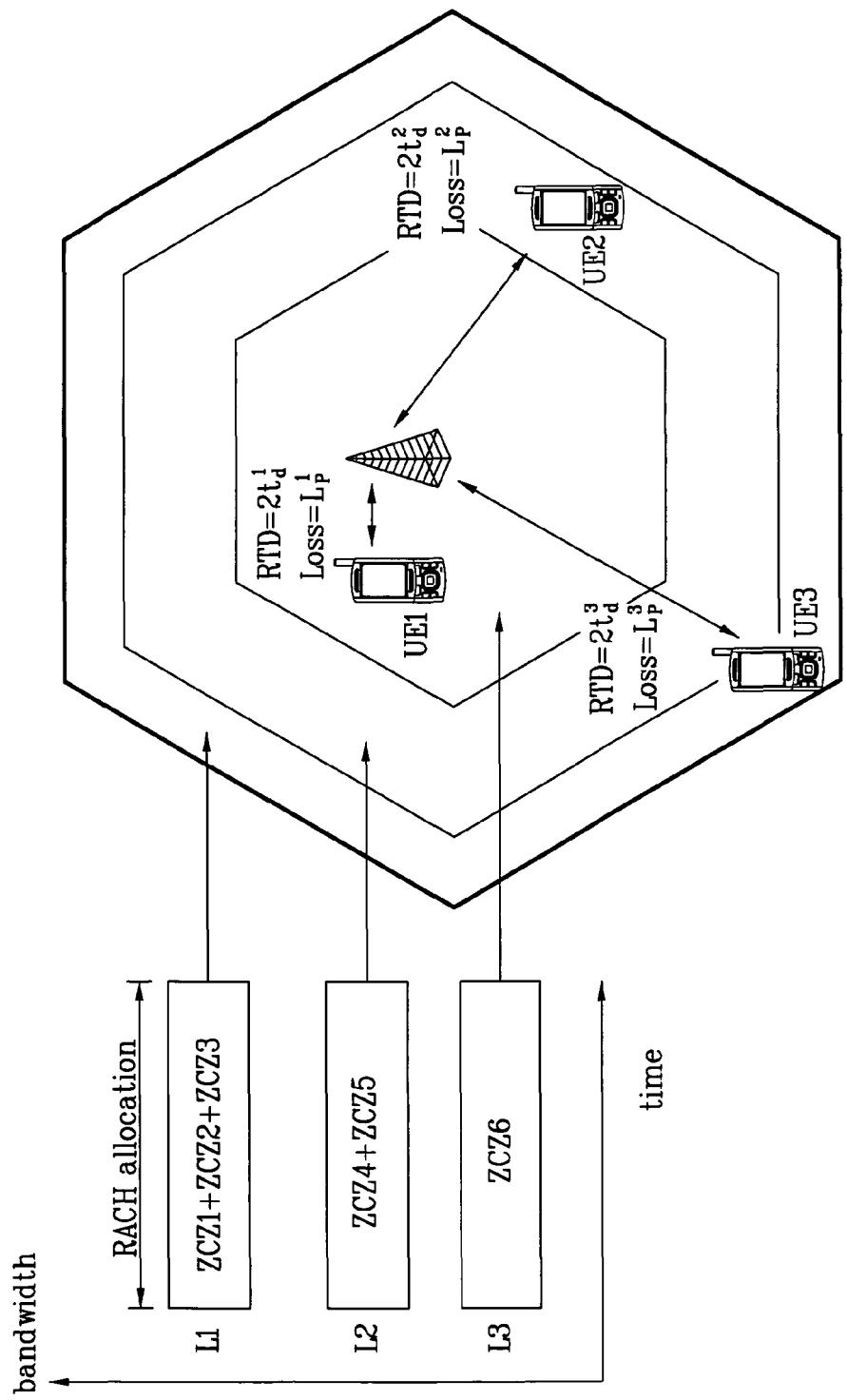
FIG. 23 illustrates a case where sequence definition is variable in each region within a cell.

FIG. 23 illustrates a case where sequence definition is variable in each region within the cell.

Referring to FIG. 23, sequences which include a different numbers of ZCZs are defined depending on the location of the user equipment within the cell. In FIG. 23, although time region lengths of the RACHs L1 to L3 are allocated equally, each user equipment may use different lengths depending on the location within the cell. In FIG. 23, it is general that the length of the RACH L1 which is used by the user equipment which is located at the boundary region of the cell is longer than that of the RACH L3 which is used by the user equipment which is located at the center of the cell. Accordingly, it is preferable that the RACH L1 having a long length allocates sequences which include ZCZs more than those of the RACH L2 and the RACH L3.

Referring to FIG. 23, the sequence is only defined for each region where the user equipment exists, and the entire length of the RACH is used without division unlike FIG. 22. In this case, it is advantageous in that interference between random access signals to which each user equipment accesses can be minimized and collision probability between different user equipments in the RACH can be reduced by differently defining sequences for each region.

The method of defining the sequence depending on the location of the user equipment within the cell may have various methods in addition to the number of ZCZs included in the sequence.

The preferred embodiment of the present invention suggests a method of differently allocating physical resources such as frequency and/or time region allocated to the RACH depending on the location of the user equipment within the cell, and a method of allocating same physical resources and differently using the physical resources allocated to the RACH depending on the location of the user equipment within the cell. Meanwhile, for convenience of description, the cell of the region illustrated in FIG. 21 is divided into two regions (R1—center region of the cell and R2—boundary region of the cell). However, the cell may be extended to a random number of regions.

Figure 24:
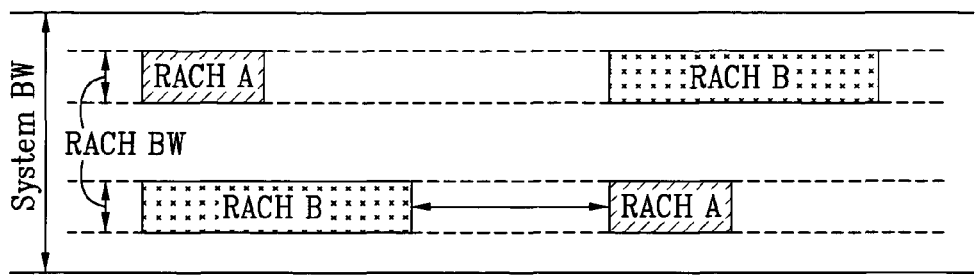
FIG. 24 and FIG. 25 illustrate a method of allocating sequences to RACH that can be used in each region within a cell to have different time region lengths in accordance with the preferred embodiment of the present invention.
Figure 25:
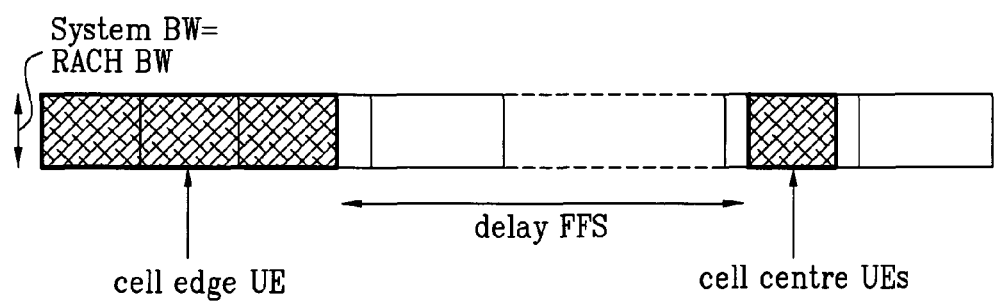

FIG. 24 and FIG. 25 illustrate a method of allocating sequences to RACH that can be used in each region within the cell to have different time region lengths in accordance with the preferred embodiment of the present invention.

The base station generates the RACH to allow the user equipment which is not connected or synchronized with the base station to access the RACH. However, since the length of the RACH becomes long, the base station cannot generate the RACH frequently to use resources in a data region. To avoid this, RACHs having different lengths are generated so that user equipments which are located at different regions access the RACHs of different lengths. In other words, as illustrated in FIG. 24, both a short RACH (RACH A) and a long RACH (RACH B) are used for the user equipments located in the region R1 in actually allocating the RACH, where the long RACH (RACH B) which satisfies requirements of the RACH for the user equipments located in the region R2 is only used for the user equipments located in the region R2. Preferably, when deciding appropriate RACH structure for each user equipment, the speed of each user equipment can be further considered. For example, the user equipment which has a high speed can only use a long RACH structure (RACH B) for using repeated sequence, where the user equipment which has a low speed can use both long RACH structure (RACH B) and short RACH structure (RACH A).

As the RACH is allocated as illustrated in FIG. 24, it is advantageous in that collision probability between the user equipments can be reduced and the transmitting side does not change access latency in accessing the RACH. In spite of these advantages, it is noted that the resources allocated from the base station to the RACH is reduced as compared with overhead occurring as the long RACH is allocated. In this case, the RACH A and the RACH B are allocated from the base station at different probabilities. These probabilities are set depending on the sizes of the regions R1 and R2 or distribution of the user equipments to minimize the entire collision probability. If the bandwidth of the RACH is equal to that of the system, the above allocation method allows the long RACH and the short RACH to alternately allocate at a period controlled by the base station as illustrated in FIG. 25.

As described above, in addition to the method of defining the user equipments of each region within the cell to have different lengths in the time region, the user equipments may be defined to have different widths in the frequency region as follows.

Figure 26:
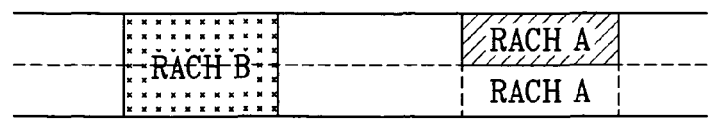
FIG. 26 illustrates a method of allocating sequences to RACH that can be used in each region within a cell to have different frequency region widths in accordance with the preferred embodiment of the present invention.

FIG. 26 illustrates a method of allocating sequences to RACH that can be used in each region within the cell to have different frequency region widths in accordance with the preferred embodiment of the present invention.

Referring to FIG. 26, the RACH A having a narrow bandwidth is used for the user equipment located in the region R2 while both the RACH A and the RACH B having a wide bandwidth are used for the user equipment located in the region R1. Since the RACH B has a bandwidth wider than that of the RACH A, path loss can be compensated, which occurs if the distance from the base station is far away. Also, if the RACH A for the user equipment located in the region R1 is allocated within the bandwidth occupied by the RACH B as a plurality of channels as illustrated in FIG. 26, the collision probability that may occur in the RACH can be reduced.

As described above, although FIG. 24 to FIG. 26 illustrate examples of the case where different resources are allocated in the time region and the frequency region depending on the location of the user equipment within the cell, it will be apparent to those skilled in the art that the RACH is set to occupy a proper time and frequency region depending on the location within the cell by combination of FIG. 24 to FIG. 26. Also, each of examples illustrated in FIG. 24 to FIG. 26 can be combined with the example of the case where different sequences are applied to each of the RACHs.

Meanwhile, in addition to the method of differently allocating physical resources to distinguish the RACH as illustrated in FIG. 24 to FIG. 26, a method of distinguishing the RACH logically may be considered.

Figure 27:
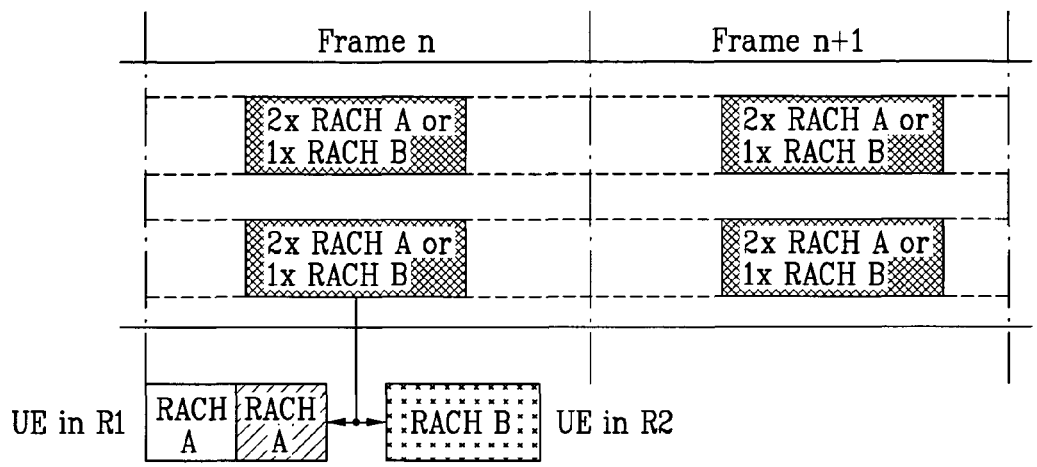
FIG. 27 illustrates a method of allocating a single RACH to all regions within a cell but using different resources within RACH for each region within the cell in accordance with the preferred embodiment of the present invention.

FIG. 27 illustrates a method of allocating a single RACH to all regions within the cell but using different resources within the RACH for each region within the cell in accordance with the preferred embodiment of the present invention.

Since the methods described with reference to FIG. 24 to FIG. 26 need different lengths and/or different bandwidths of the RACH for each region, a method of separately allocating them is required, which may be inefficient in view of use in resources. Since the RACH required by the user equipment is needed as a channel where the user equipment can access, physical resources are actually allocated at a length required for the user equipment located in the region R2 which is in the boundary of the cell, and the user equipment located in the region R1 which is within the center region of the cell can use the allocated physical resources of the RACH by logically dividing them. In other words, the user equipments located in the region R1 access the channel by construing the channel as several slots having short lengths if the allocated resources are long. The user equipment randomly selects one of several slots after construing the channel as several slots.

In FIG. 27, the user equipment located in the region R1 construes the RACH allocated equally as two RACHs and randomly uses one of the RACHs while the user equipment located in the region R2 construes the RACH allocated equally as one channel and accesses the channel. According to this method of FIG. 27, it is possible to reduce the collision probability in the RACH while equally maintaining the structure of the RACH regardless of region division within the cell. Also in this method, the speed of the user equipment can be further considered. For example, the low speed user equipment construes the RACH allocated equally as two RACHs, while the high speed user equipment construes the RACH allocated equally as one channel.

Figure 28:
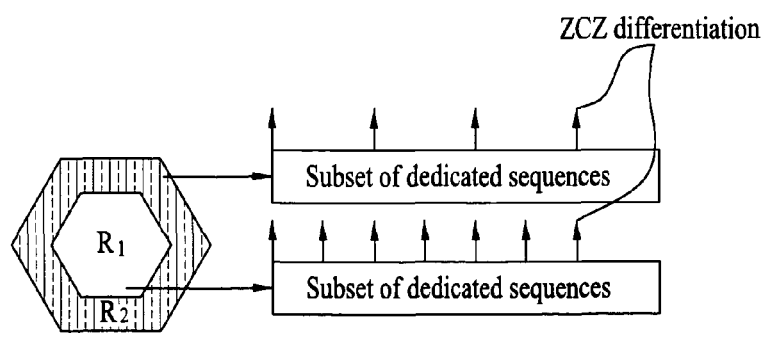
FIG. 28 illustrates a structure of sequences defined differently depending on location of a user equipment within a cell in accordance with the preferred embodiment of the present invention.

FIG. 28 illustrates a structure of sequences defined differently depending on the location of the user equipment within the cell in accordance with the preferred embodiment of the present invention.

The sequences used to access the RACH in each region divided depending on the distance from the base station within the cell can be defined differently as described above. In this case, as illustrated in FIG. 23, the sequences to be applied to the long RACH for the user equipments located in the boundary of the cell can be defined to include ZCZs more than those of the sequences to be applied to the short RACH for the user equipments located in the center of the cell. In this case, the collision probability in the RACH can be reduced by selection of the same sequences.

Meanwhile, FIG. 28 illustrates the method of differently defining sequences depending on the location of the user equipment within the cell in view of the width of ZCZs not the number of ZCZs. Referring to FIG. 28, as a subset of designated sequences for the region R1 located in the center of the cell has a ZCZ interval narrower than that of a subset of designated sequences for the region R2 located in the boundary of the cell, the number of sequences that are variable depending on circular shift increases. This is because that the region R1 is less affected by delay spreading to easily identify the sequences even though the region R1 has the ZCZ interval narrower than that of the region R2.

Generally, if a given number of sequences are used for one cell or RACH slot, they can be divided into a group against bit for representing information. In other words, if 64 sequences are allocated, and bits to be transmitted from the user equipment to the RACH are 3 bits, a total of 8 sequence groups are generated. If the bits to be transmitted from the user equipment to the RACH are 2 bits, a total of 16 sequence groups are generated. These groups may be selected randomly by the user equipment, and the number of user equipments which simultaneously transmit same information is limited to the number of the groups. Supposing that the number of groups used for the user equipments located in the region R2 is N2 and the number of groups used for the user equipments located in the region R1 is N1 by means of segment of the sequences divided into the groups, the group corresponding to N1 can be defined again depending on the size of the cell based on the description with reference to FIG. 14. In other words, since allocation of the sequences is determined based on the user equipments located in the boundary of the cell, orthogonality (i.e., zero-correlation) of available sequences is set to adapt to the boundary of the cell. However, since the user equipments within the cell are less affected by delay than those in the boundary of the cell, they can have ZCZ having a narrower width, thereby forming more orthogonality sequences. Accordingly, N1' number of groups (N1≦N1') regenerated can be allocated to the user equipments located in the region R1 by narrowing the ZCZ interval from N1. This increases available sequences, and the collision probability in the RACH can be reduced correspondingly.

If the RACHs having the same structure in the present invention are differently construed depending on the location of each user equipment within the cell and used based on the aforementioned description, the following methods may be considered.

Figure 29:
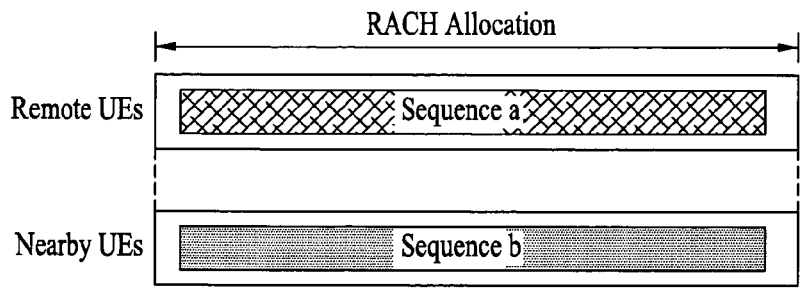
FIG. 29 to FIG. 31 respectively illustrate a case where sequences applied within RACH are variable depending on location of a user equipment within a cell, a case where different time resources are used, and a case where different frequency resources are used in accordance with the preferred embodiment of the present invention.
Figure 30:
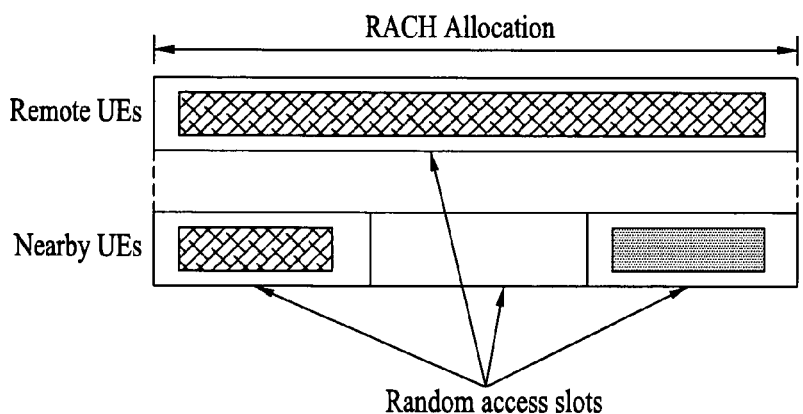
Figure 31:
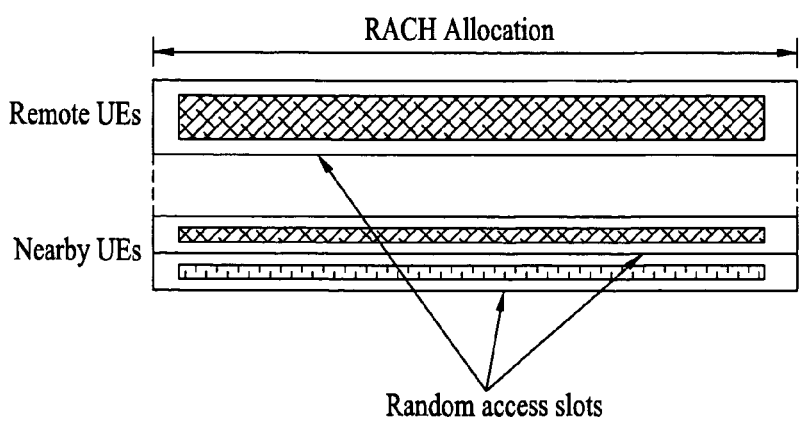

FIG. 29 to FIG. 31 respectively illustrate a case where sequences applied within the RACH are variable depending on the location of the user equipment within the cell, a case where different time resources are used, and a case where different frequency resources are used in accordance with the preferred embodiment of the present invention.

Referring to FIG. 29, sequence$_a$ is defined as a sequence used for the user equipment located in the boundary of the cell to access the RACH, and sequence$_b$ is defined as a sequence used for the user equipment located in the center of the cell to access the RACH. In this way, different sequences are defined. As described above, the sequence$_a$ and the sequence$_b$ may have a different number of ZCZs or a different widths of ZCZs, or may be sequences having a different number of depending on the reason why the user equipments accesses the RACH and the location where the user equipment accesses the RACH. In this case, the collision probability in the RACH can be reduced, and if the sequence$_b$ has a ZCZ width narrower than that of the sequence$_a$, the number of available sequences can be increased as described above.

Furthermore, FIG. 30 and FIG. 31 respectively illustrate a method of using different time regions depending on the location of the user equipment within the cell in the same RACH and a method of using different frequency regions depending on the location of the user equipment within the cell in the same RACH. In this case, the collision probability in the RACH can be reduced, and an opportunity of random access can be given to the user equipments located in the center of the cell.

Although the methods illustrated in FIG. 29 to FIG. 31 may be used independently, they may be used by their random combination. For example, the method of applying different sequences to the RACH defined to use different lengths in the time region may be obtained by combination of the methods illustrated in FIG. 29 and FIG. 30. Also, the method of applying different sequences to the RACH defined to use different bandwidths may be obtained by combination of the methods illustrated in FIG. 29 and FIG. 31. Furthermore, all the methods illustrated in FIG. 29, FIG. 30 and FIG. 31 may be used to apply different sequences to the RACH defined to use different time and frequency regions.

In the aforementioned embodiments, it is supposed that the user equipment knows the region to which the user equipment belongs within the cell. However, when the user equipment accesses the RACH, it may not know the region to which the user equipment belongs. In this case, it is difficult for the user equipment to be operated by assuming that the user equipment belongs to a random region. In other words, the user equipment can surely assume the region to which the user equipment belongs if it knows some parameters such as path loss and round-trip delay of downlink signals from the base station. It may be difficult to obtain these parameters. Accordingly, when the user equipment adjusts downlink synchronization and extracts system parameters to access the RACH, if the system (base station) notifies the user equipment of a transmission power level, the user equipment can determine its location through signal attenuation of the downlink signals. If the location of the user equipment is determined, the user equipment can access the RACH through the method described above. If the system does not notify the user equipment of a transmission power level, the user equipment should initially access the base station on the assumption that the user equipment is located in the worst location, i.e., the region R2. Then, the user equipment can know information of round-trip delay and path loss, it can efficiently use the RACH resources using the segmented access scheme suggested in a synchronous or non-synchronous access scheme.

Furthermore, in the aforementioned embodiments of the present invention, although the location of the user equipment within the cell may mean the distance between the user equipment and the base station, it is preferable that the location of the user equipment represents information as to whether the user equipment belongs to which region within the cell based on the distance between the user equipment and the base station. For example, if the user equipment is far away from the base station at a certain distance or greater, the user equipment determines that the user equipment is located in the boundary of the cell. If the user equipment is far away from the base station at a distance less than a certain distance, the user equipment can determine that the user equipment is located in the center of the cell. The reference distance for dividing the region within the cell may be greater than 1, and the level of each reference distance can be determined by various parameters such as antenna height of the base station, the transmission power, etc.

Figure 32:
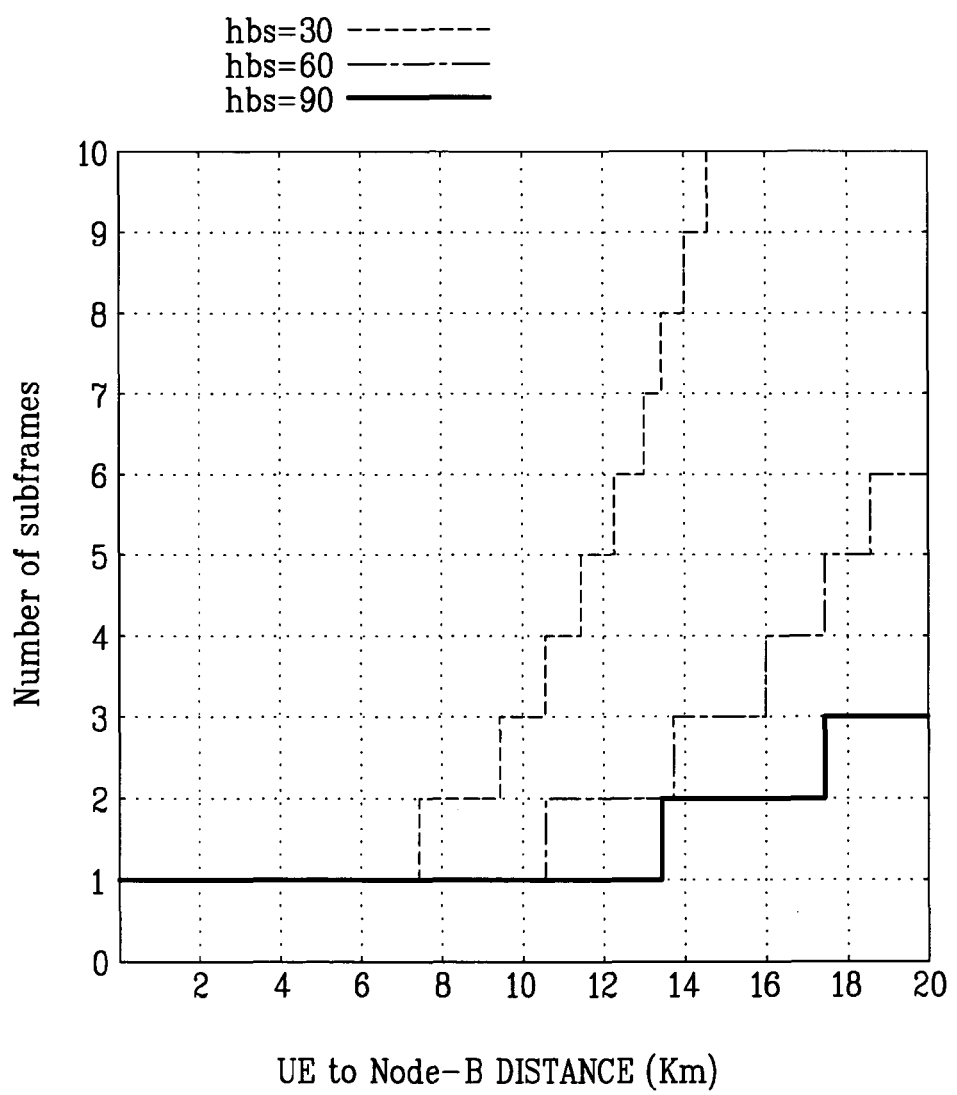
FIG. 32 illustrates increase transition of RACH length required as distance between a user equipment and a base station increases in accordance with an antenna height of the base station.

FIG. 32 illustrates increase transition of the RACH length required as the distance between the user equipment and the base station increases in accordance with the antenna height of the base station.

Referring to FIG. 32, a horizontal axis represents the distance between the user equipment and a node R (or base station) as km, and a vertical axis represents the number of subframes occupied by the RACH in accordance with the distance. In FIG. 32, it is assumed that the subframes have a length of 0.5 ms as prescribed in the current 3GPP LTE. As illustrated in FIG. 32, if the antenna height of the base station (HBS) is 90 m, it is noted that the number of subframes required depending on the distance is less increased than the case where the antenna height of the base station is 60 m or 30 m. By contrast, if the antenna height of the base station is 30 m, it is noted that the number of subframes is quickly increased. Accordingly, in the preferred embodiment of the present invention, the distance between the user equipment and the base station, which is used to divide the region within the cell, is determined considering the antenna height of the base station. For example, if the region within the cell is divided into three regions of R1, R2 and R3 as illustrated in FIG. 21, the distances (for example, D1 and D2) based on this division can be set in such a manner that the case where the antenna height of the base station is 90 m is smaller than the case where the antenna height of the base station is 30 m. Also, in addition to the antenna height of the base station, various parameters such as the transmission power should be considered to divide the region.

Hereinafter, a configuration of an apparatus for transmitting signals from the user equipment by using the structure of the RACH and the sequences applied to the RACH will be described.

Figure 33:
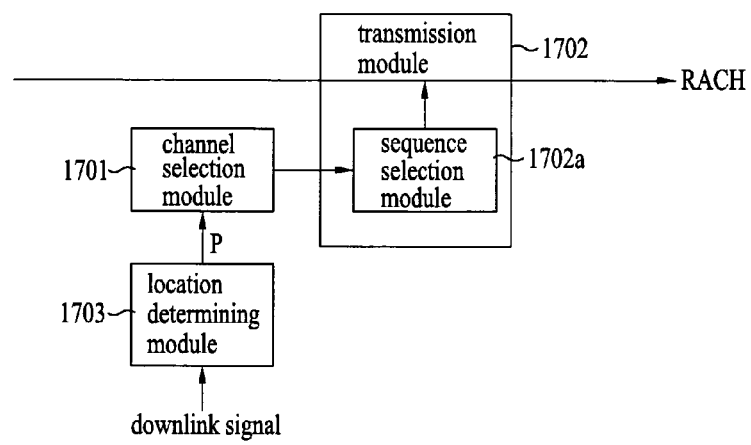
FIG. 33 is a block diagram illustrating a characterized configuration of a signal transmitting apparatus according to the preferred embodiment of the present invention.

FIG. 33 is a block diagram illustrating a characterized configuration of a signal transmitting apparatus according to the preferred embodiment of the present invention.

First of all, the signal transmitting apparatus according to the embodiment of the present invention includes a channel selection module 1701, a transmission module 1702, and a location determining module 1703 which is required as the case may be. In accordance with the embodiment of the present invention, the transmission module 1702 may include a sequence selection module 1702 for selecting a sequence to be applied to a channel selected by the channel selection module 1701. As described above, if the base station notifies the user equipment of the transmission power, the location determining module 1703 of the user equipment determines its location within the cell through signal attenuation of the downlink signals from the base station to generate location information P. If it is difficult to know signal attenuation of the downlink signals, the user equipment performs initial access on the assumption that the user equipment is the farthest away from the base station within the cell, and the location determining module 1703 can acquire location information P of the user equipment through signal attenuation received from the base station in response to the initial access.

The location information P is input to the channel selection module 1701, and the channel selection module 1701 selects a channel corresponding to the location information P among channels defined differently depending on the location of the user equipment within the cell. This channel may be a channel to which physical resources of the time region and/or the frequency region are allocated differently depending on the location of the user equipment within the cell or a channel to which same resources are allocated but which is defined to use different amounts of the resources depending on the location of the user equipment within the cell. Also, the aforementioned channel may de defined to generate different sequences applied depending on the location. If a corresponding channel is selected based on the location information P input from the location determining module 1703 as described above, the transmission module 1702 can transmit signals using the selected channel.

Also, the transmission module 1702 may include a separate sequence selection module 1702a for selecting a sequence to be applied to the selected channel. The sequence selection module 1702a can select a sequence corresponding to the information P among the sequences differently defined depending on the location of the user equipment within the cell in accordance with the embodiment of the present invention. After the sequence having the information to be transmitted is applied to the channel such as RACH, signal transmission to the base station can be performed.

Meanwhile, the method of dividing the region depending on the distance between the user equipment and the base station within the cell and increasing a reuse rate of the sequences within the cell by allocating the sequences differently considering different requirements required for each region will be suggested in accordance with another embodiment of the present invention. In other words, a method of allocating sequences in accordance with the aforementioned segmented access scheme will be described.

It is possible to reduce the collision probability due to use of the same sequence in the RACH by allocating the sequences based on the segmented access scheme. Also, the preferred embodiment of the present invention suggests a method of increasing the number of available sequences by redefining the sequences considering the different requirements required for each region.

Figure 34:
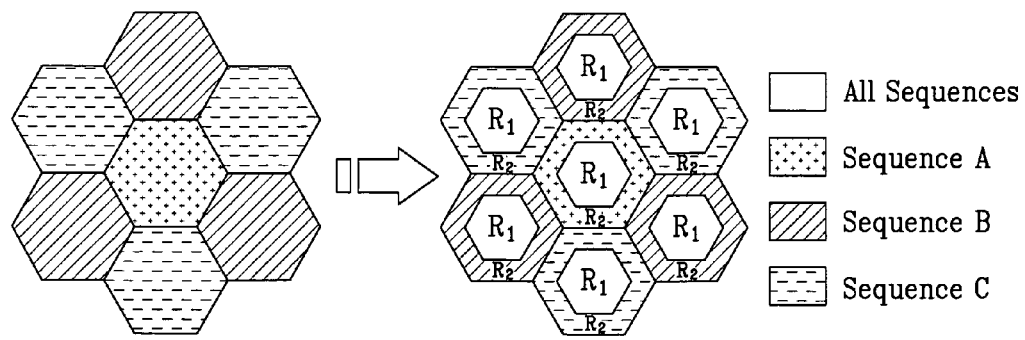
FIG. 34 and FIG. 35 illustrate a method of allocating sequences in accordance with the preferred embodiment of the present invention.
Figure 35:
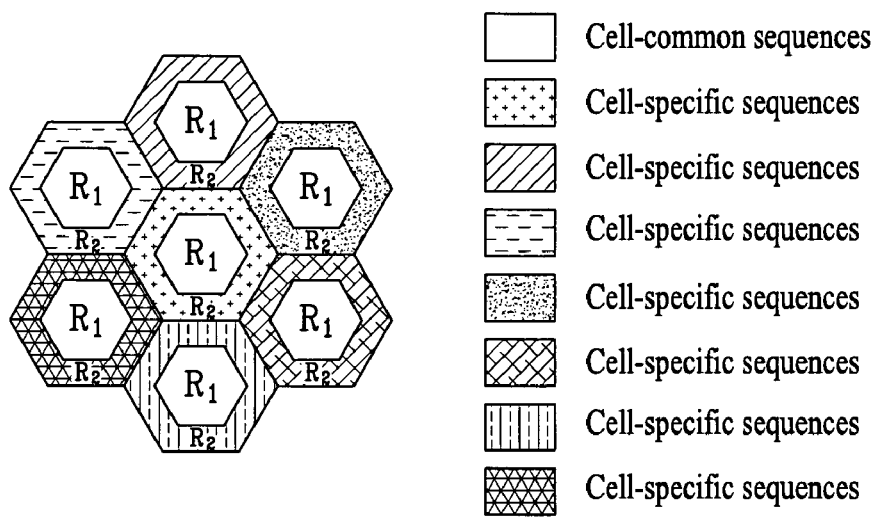

FIG. 34 and FIG. 35 illustrate a method of allocating sequences in accordance with the preferred embodiment of the present invention.

In the current 3GPP LTE, a method of divisionally allocating sequences of a certain amount to each cell as illustrated at the right of FIG. 34 is most safely used as a method of allocating sequences used for the RACH. In this case, an available minimum sequence reuse factor is 3, which is not good, as illustrated at the left of FIG. 34 (sequence A, sequence B and sequence C). Accordingly, in the preferred embodiment of the present invention, as illustrated at the right of FIG. 34, the cell is divided into the region R1 and the region R2 depending on the distance from the base station, wherein the region R1 is close to the base station. In this case, a sequence reuse method based on a segmented access scheme is suggested, which differently defines allocation of available sequences in each region.

The right of FIG. 34 illustrates that a reuse factor is 3 like the left of FIG. 34. Among available entire sequences, a sequence group different from a sequence group available for an adjacent cell is allocated to the user equipments in the region R2 which is the boundary of the cell, and an entire random access group is allocated to the user equipments in the region R1 which is within the cell (the right of FIG. 34 illustrates that all sequences are allocated to the region R1). In this case, it is possible to increase the number of sequences that can be used by the user equipments in the region R1, and thus it is possible to reduce the collision probability of the RACH according to selection of the same sequence. Generally, the probability that the random access signal transmitted by the user equipment in the region R1 affects the adjacent cell is very small. Also, if the transmission power of the user equipment in the region R1 is smaller than that of the user equipments in the region R2, it is preferable that an influence upon the adjacent cell can be reduced more and more.

Meanwhile, for convenience of description, the cell is exemplarily divided into the two regions R1 and R2 in the example described with reference to FIG. 34. Otherwise, the cell may be divided into a number of regions more than the two regions. At this time, a predetermined number of regions located in the center of the cell may be determined as the regions available for the entire random access group, and a sequence group different from that allocated to the boundary region of the adjacent cell may be allocated to a predetermined number of regions located in the boundary of the cell. Whether each region is divided into the center region of the cell or the boundary region of the cell can be selected properly depending on the antenna height of the base station, the transmission power, etc.

If sequences are allocated to each region such as the regions R1 and R2 within one cell, it is general that among sequences of a sequence group allocated to the corresponding cell, a sequence to be used in the region R1 and a sequence to be used in the region R2 are divisionally allocated. However, as described with reference to FIG. 34, since the RACH signal of the region R1 less affects the adjacent cell, sequence allocation can be performed more freely. Considering this, all sequences of a sequence group divisionally allocated for each cell are allocated to the user equipment in the region R2, and the entire random access sequences are allocated to the region R1 as described in the example illustrated in FIG. 34.

Meanwhile, FIG. 35 illustrates a method of allocating sequences in accordance with another embodiment of the present invention. Referring to FIG. 35, the sequence group different from that allocated to the adjacent cell is allocated to the region R2 depending on a proper reuse factor (although FIG. 35 illustrates that different sequence groups are allocated to the region R2 of all cells, the reuse factor may be selected randomly if necessary). Also, sequences are allocated to the user equipments located in the region R1 to use sequences common for all cells (hereinafter, referred to as "cell common sequences") unlike the case of FIG. 34. If the cell common sequences are allocated to the region R1, the sequences used in the center of all cells are unified to simplify sequence detection and improve detection performance.

Referring to the example of FIG. 35, the cell is divided into two regions, wherein the region inside the cell uses common sequences while the region outside the cell uses different sequences. In this case, transmission is performed at the maximum power in the region outside the cell to allow the base station to facilitate signal detection. At this time, the signal may affect the adjacent cell. Accordingly, the common sequences are used within the cell, sequences (i.e., sequences allocated to the region R2) allocated to the corresponding cell and the cell common sequences are used, wherein the cell common sequences may be comprised of a sequence set, which is not used for cell planning, among the entire sequence set. However, since the signal in the region R1 less affects the adjacent cell as described above, the cell common sequences allocated to the region R1 are not needed as a sequence set which is not used for cell planning.

Referring to FIG. 34 and FIG. 35, the user equipments in the region R2 use the RACH as it is and also use a sequence set to which a proper reuse factor is applied so as not to affect the adjacent cell, whereas the user equipments in the region R1 are set to use the sequence set allocated to the region R2, additional sequence sets which remain, or the cell common sequences. Moreover, the other sequence sets except for the sequence set allocated to the region R2 may be redefined as described later to increase the number of available sequences.

In other words, according to the preferred embodiment of the present invention, the width of the ZCZ of sequences to be used can be defined differently depending on each region within the cell as illustrated in FIG. 28.

Generally, sequences that can be used by the user equipments in each region should be determined separately by various methods. The standard for determining the sequences may be determined depending on the location of the user equipment or cell planning. If there exists a sequence number determined to be used for one cell or RACH slot, this can be classified into a group against bits for representing information. In other words, if 64 sequences are allocated and bits to be transmitted from the user equipment to the RACH are 3 bits, a total of 8 groups are generated. Also, if the bits to be transmitted from the user equipment to the RACH are 2 bits, a total of 16 groups are generated. These groups may be selected randomly by the user equipment, and the number of user equipments which simultaneously transmit same information is limited to the number of groups. When the sequences divided into the groups are divided to form the number N2 of groups to be used by the user equipments in the region R2 and the number. N1 of groups to be used by the user equipments in the region R1, the number N1 of groups can be redefined depending on the size of the cell.

In a cellular communication system, since sequence allocation is determined based on the user equipment located in the boundary of the cell, orthogonality (for example, zero-correlation zone) of available sequences is set to adapt to the boundary of the cell. Specifically, the number of sequences is determined by the product (i.e., the number of mother sequences*the number of ZCZs (the number of applicable circular shifts) of the number of mother sequences and the number of circular shifts to be applied depending on the number of ZCZs in each mother sequence. The number of the circular shifts, i.e., the number of ZCZs is set so that the ZCZ has an interval which is not affected by spreading of sequences. The width of the ZCZ is generally set based on the boundary of the cell. However, since the user equipments within the cell are less affected by spreading than those in the boundary of the cell, detection can be performed even though the user equipments can have ZCZ having a narrower width. Thus, if the width of the ZCZ of the sequences used in the center region of the cell is narrow, more orthogonality sequences can be generated. Accordingly, N1' number of regenerated groups (N1≦N1') can be allocated to the user equipments located in the region R1 by readjusting the width of the ZCZ from N1. FIG. 28 illustrates widths of ZCZs through comparison, which are available in the sequences used by the user equipments in the region R1 which is the center region of the cell and the sequences used by the user equipments in the region R2 which is the boundary region of the cell. As illustrated in FIG. 28, since the width of the ZCZ of the sequences for the user equipments in the region R1 can be set to be narrower, the number of orthogonal sequences that can be used by the user equipments in the region R1 can increase as much as the amount corresponding to the number of ZCZs increased to the mother sequences. The preferred embodiment of the present invention suggests increase of the number of available sequences by means of sequence redefinition as above.

If the sequences are allocated by the aforementioned method, since the user equipments located in the region R1 may use the entire sequences or cell common sequence groups, an opportunity of the entire random access increases if the size of the region R1 increases. Also, as illustrated in FIG. 28, if the width of the ZCZ of the sequences used by the user equipments in the region R1 is defined by change, the opportunity of the random access can be increased more efficiently as the region R1 increases.

Figure 36:
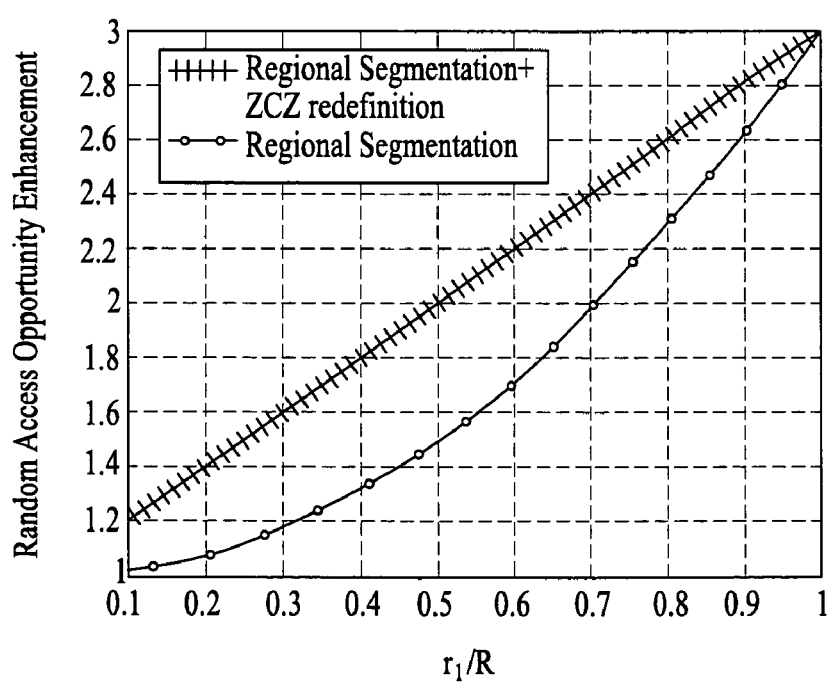
FIG. 36 is a graph illustrating increase of random access opportunity under a sequence definition shown in FIG. 28.

FIG. 36 is a graph illustrating increase of random access opportunity under a sequence definition method illustrated in FIG. 28.

Referring to FIG. 36, the range of random access improvement is illustrated when the sequence definition method, i.e., local segmented access, according to the embodiment of the present invention is used (graph shown by an oblique line) and when redefinition of the ZCZ illustrated in FIG. 28 is used for the local segmented access (graph shown by circles). In FIG. 36, a horizontal axis represents a ratio between the radius R of the cell and a radius $r_1$ of the region R1 which represents the center region of the cell in FIG. 34 and FIG. 35, and a vertical axis represents an increase level of random access opportunity when the case where the segmented access scheme of the present invention is not used is represented by 1.

As illustrated in FIG. 36, if the sequences are allocated by local segmented access in accordance with the embodiment of the present invention, it is noted that random access opportunity increases as the radius $r_1$ of the region R1 increases. FIG. 36 illustrates that random access opportunity increases more efficiently if ZCZ redefinition is simultaneously used. However, the reason why the sequences used by the user equipments in the region R1 are freer than those used by the user equipments in the region R2 considers the status that there is little interference between the adjacent cells. Accordingly, increase of the radius of the region R1 should be set considering interference between the adjacent cells. Specifically, various parameters such as the antenna height of the service base station of the corresponding cell and the transmission power used by the user equipments in the region R1 should be considered.

Meanwhile, a method of efficiently using the aforementioned sequence allocation method and increasing the probability of sequence detection will be described below.

Generally, if the size of the cell increases, it is preferable that the length of the RACH increases. Sequences used for the extended RACH having a length increased in accordance with the size of the cell can be generated by increasing the length of the sequences to adapt to the increased length of the RACH as illustrated in FIG. 19. Alternatively, long sequences can be obtained by repeating basic sequences as illustrated in FIG. 17.

Meanwhile, the sequence allocation method in FIG. 34 and FIG. 35 does not consider the condition of the length of the sequences. The preferred embodiment of the present invention suggests a method of improving detection performance of RACH signal by additionally considering the sequence length extension method according to increase in the size of the cell. It is likely that orthogonality may be damaged if CAZAC sequences or other sequences have different lengths.

Furthermore, if the region within the cell is divided into the center region R1 of the cell and the boundary region R2 of the cell in a large cell to allow the user equipments in each region to access the RACH, the user equipments can access the RACH by using different physical regions. Although physical resources are allocated to the RACH used by the user equipments, the RACH may be set in such a manner that each region uses different amounts of the resource regions. If the region R1 and the region R2 commonly use the same physical channel region, when the user equipment accesses the RACH using sequences of different lengths as described above, detection performance may be degraded due to damage of orthogonality.

Figure 37:
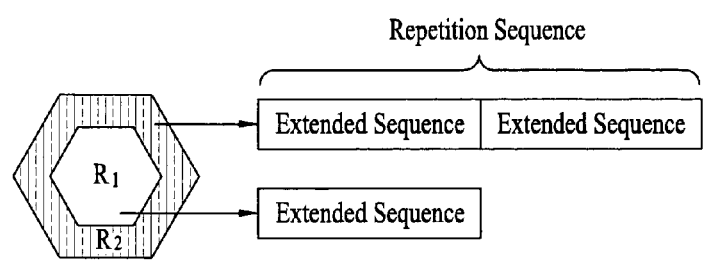
FIG. 37 illustrates a method of generating repeated sequences according to the preferred embodiment of the present invention.

FIG. 37 illustrates a method of generating repeated sequences according to the preferred embodiment of the present invention.

Referring to FIG. 37, the sequences are designed based on the center region R1 of the cell not the boundary of the cell to solve the aforementioned problem. The boundary region R2 of the cell uses repeated sequences in which the sequences of the region R1 are repeated. In this case, even though the user equipment accesses the RACH in a random region within the cell, orthogonality of the sequences can be maintained and the user equipment can access the RACH without degradation of detection performance even in case that the physical channel of the RACH is commonly used for the user equipments in the region R1 and the region R2. Also, using the repeated sequence may be helpful for the frequency offset problem. So, it is preferred that the high speed user equipment uses the repeated sequence structure as shown in the FIG. 37.

Hereinafter, a method for transmitting signals from the user equipment using sequences allocated depending on the sequence allocation method according to the aforementioned embodiment of the present invention and an apparatus for signal transmission will be described.

The sequences allocated by the sequence allocation method in the aforementioned embodiment of the present invention are based on the sequence allocation method which depends on each region within the cell. Specifically, sequence groups to be used by the user equipments located in the boundary region R2 of the cell are different from sequence groups allocated to the adjacent cell as described with reference to FIG. 34 and FIG. 35. Since the sequences to be used by the user equipments located in the center region R1 of the cell less affect the adjacent cell, they are allocated in such a manner that available sequences in the entire system are all used or cell common sequences are used. Accordingly, the method for transmitting signals from the user equipment according to another embodiment of the present invention needs to determine whether the corresponding user equipment is located in which region within the cell. If the base station notifies the user equipment of a transmission power level, the user equipment can determine its location through signal attenuation of the downlink signals. If it is difficult to determine the level of signal attenuation of the downlink signals, the user equipment performs initial access assuming the worst status that the user equipment is the farthest away from the base station within the cell, and can determine its location by identifying the attenuation level of the downlink signals received from the base station in response to the initial access.

In this way, the user equipment can determine its region to which the user equipment belongs. Afterwards, the user equipment selects the sequence group allocated to the region to which the user equipment belongs. If the user equipment determines that it is located in the boundary region R2 of the cell, the user equipment can select a sequence group different from that allocated to the adjacent cell depending on the proper reuse parameter selected by the aforementioned sequence allocation method. If the region determined by the user equipment is the center region R1 of the cell, the user equipment may select all sequence groups or sequence groups defined by the cell common sequences depending on the sequence allocation method. The user equipment which has selected the sequence groups as above can transmit signals by selecting a proper sequence among the corresponding sequence groups in accordance with information to be transmitted to the base station.

Meanwhile, the apparatus for implementing the method for transmitting signals from the user equipment according to the embodiment of the present invention will be described below.

Figure 38:
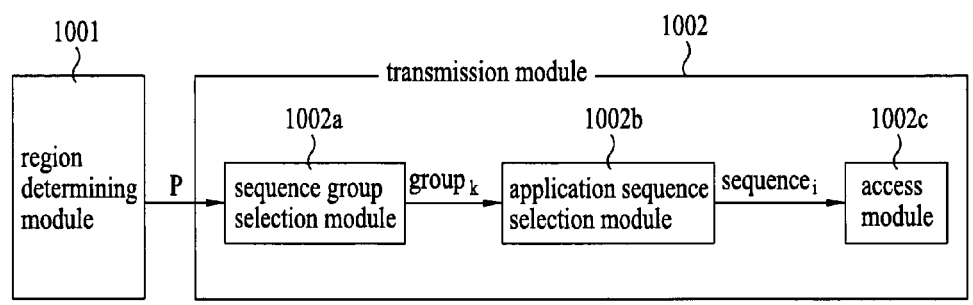
FIG. 38 is a block diagram illustrating a signal transmitting apparatus according to the preferred embodiment of the present invention.

FIG. 38 is a block diagram illustrating the signal transmitting apparatus according to the preferred embodiment of the present invention.

First of all, the signal transmitting apparatus of the user equipment according to the embodiment of the present invention includes a region determining module 1001 and a transmission module 1002. The region determining module 1001 can determine whether the user equipment belongs to which region within the cell through attenuation of the downlink signals from the base station. If it is difficult to identify the attenuation level of the downlink signals as described above, the user equipment may use signals separately received from the base station through initial access.

Meanwhile, the aforementioned transmission module 1002 may include a sequence group selection module 1002*a*, an application sequence selection module 1002*b* and an access module 1002*c* depending on its function. First of all, the sequence group selection module 1002*a*, which has received information P of the region to which the user equipment belongs from the region determining module 100, selects a sequence group group$_k$ allocated to the corresponding region. The selected sequence group group$_k$ may select a sequence group divided from the adjacent cell depending on the selected reuse factor if the user equipment belongs to the region R2, select the entire sequence groups depending on the sequence allocation method if the user equipment belongs to the region R1, or select sequences defined as the cell common sequences. Afterwards, the selected sequence group group$_k$ is input to the application sequence selection module 1002*b*, and the application sequence selection module 1002*b* selects a sequence sequence$_i$ to be applied to the RACH among corresponding sequence groups in accordance with information to be transmitted to the base station. In this way, if the application sequence is selected, the signal transmitting apparatus of the user equipment can access the corresponding RACH through the access module 1002c.

As described above, the detailed description according to the preferred embodiment of the present invention has been provided in the range that those skilled in the art can implement and carry out the present invention. Although reference has been made to the preferred embodiments of the present invention, it will be apparent to those skilled in the art that the present invention can be embodied in other specific forms without departing from the spirit and essential characteristics of the invention. For example, although the present invention has described the channel structure based on the RACH, the channel structure of the present invention may be applied to a random channel as far as the system which increases the channel length in accordance with increase of the radius of the cell can select a signal length applied depending on the distance between the user equipment and the base station. Also, the length of the preamble to be used may be selected based on the location information of the user equipment within the cell even in the case that only the preamble of the channel, specifically RACH increases in addition to the case that the length of the entire channel increases if the radius of the cell increases in the aforementioned embodiments.

Thus, the above embodiments of the present invention are to be considered in all respects as illustrative and not restrictive. The scope of the invention should be determined by reasonable interpretation of the appended claims and all change which comes within the equivalent scope of the invention are included in the scope of the invention.

Industrial Applicability

According to the embodiment of the present invention, the segmented access scheme, which considers requirements differently required depending on the distance between the user equipment and the base station in the large cell, is suggested to be used for various uplink signal transmission methods required for efficient resource allocation as well as the RACH.

What is claimed is:

1. A method for transmitting signals from a user equipment in a communication system, the method comprising:
   selecting a channel configuration depending on a current location of the user equipment from among available channel configurations defined differently depending on a location of the user equipment within a cell; and
   transmitting signals using the selected channel configuration,
   wherein the transmitting the signals includes:
      determining a region to which the user equipment belongs among a plurality of regions divided depending on a distance between the user equipment and a base station; and
      transmitting sequences allocated to the determined region by using the selected channel configuration,
   wherein, if the determined region is a region which is adjacent to a boundary of the cell within a predetermined distance among the plurality of regions, the sequences allocated to the determined region are different from those allocated to adjacent cells, and
   wherein, if the determined region is a region which is far away from the boundary of the cell at the predetermined distance or greater among the plurality of regions, the sequences allocated to the determined region are commonly used with the adjacent cells.

2. The method of claim 1, wherein the available channel configurations defined differently are obtained by allocating resources differently depending on the location of the user equipment.

3. The method of claim 2, wherein the allocating resources differently includes differently allocating time resources, frequency resources or time and frequency resources.

4. The method of claim 1, wherein the available channel configurations defined differently are defined to use resources of the channel differently depending on the location of the user equipment.

5. The method of claim 4, wherein the resources used differently include time resources, frequency resources or time and frequency resources.

6. The method of claim 1, wherein the available channel configurations defined differently are defined to allocate sequences differently depending on the location of the user equipment.

7. The method of claim 1, wherein the sequences allocated differently are those having different lengths of zero correlation zones (ZCZ).

8. The method of claim 1, wherein the communication system increases at least one of time resources of the channel, frequency resources of the channel, and intervals of ZCZs in proportion to a radius of the cell.

9. The method of claim 1, wherein the channel is a random access channel, and the current location of the user equipment within the cell is acquired through signal attenuation of downlink signals.

10. The method of claim 1, wherein the channel is a random access channel, and the current location of the user equipment within the cell is acquired by:
   initially accessing the base station using a channel configuration defined based on a case where the user equipment within the cell is the farthest away from the base station; and
   determining the current location of the user equipment within the cell through signals received from the base station in response to the initial access.

11. The method of claim 1, wherein the selecting a channel configuration includes considering at least one of path loss, round-trip delay and a speed of the user equipment.

12. The method of claim 2, wherein if there is no response to signal transmission of the transmitting signals from the base station, further comprising retransmitting the signals using a second channel configuration in which time resources, frequency resources or and time and frequency resources are more increased than the selected channel configuration.

13. The method of claim 4, wherein if there is no response to signal transmission of the transmitting signals from the base station, further comprising retransmitting the signals using a second channel configuration in which time resources, frequency resources or and time and frequency resources are more increased than the selected channel configuration.

14. A method for transmitting signals from a user equipment in a communication system, the method comprising:
   selecting a sequence depending on a current location of the user equipment from among available sequences allocated depending on a location of the user equipment within the cell; and
   transmitting the signals using the selected sequence,
   wherein the step of selecting the sequence includes:
      determining a region to which the user equipment belongs among a plurality of regions divided depending on a distance between the user equipment and a base station; and
      selecting the sequence among sequences allocated to the determined region, wherein, if the determined region is a first region which is adjacent to a boundary of the cell within a predetermined distance among the plurality of regions, the sequences allocated to the determined region are different from those allocated to adjacent cells, and wherein, if the determined region is a second region which is far away from the boundary of the cell at the predetermined distance or greater among the plurality of regions, the sequences allocated to the determined region are commonly used with the adjacent cells.

15. The method of claim 14, wherein the sequences allocated to the first region and the sequences allocated to the second region have different zero correlation zones (ZCZ).

16. An apparatus of transmitting signals from a user equipment in a communication system, the apparatus comprising:

a channel configuration selection module configured to select a channel configuration depending on a current location of the user equipment among channel configurations defined differently depending on a location of the user equipment within a cell; and a transmission module configured to
 transmit the signals using the channel configuration selected by the channel configuration selection module,
 determine a region to which the user equipment belongs among a plurality of regions divided depending on a distance between the user equipment and a base station, and
 transmit sequences allocated to the determined region by using the selected channel configuration, wherein, if the determined region is a region which is adjacent to a boundary of the cell within a predetermined distance among the plurality of regions, the sequences allocated to the determined region are different from those allocated to adjacent cells, and wherein, if the determined region is a region which is far away from the boundary of the cell at the predetermined distance or greater among the plurality of regions, the sequences allocated to the determined region are commonly used with the adjacent cells.

17. The apparatus of claim 16, wherein the transmission module includes a sequence selection module configured to select the sequences allocated to the determined region.

18. The apparatus of claim 16, further comprising:

a location determining module configured to determine the current location of the user equipment through signals received from the base station.

* * * * *